US012745884B2

(12) United States Patent
Yoon et al.

(10) Patent No.: US 12,745,884 B2
(45) Date of Patent: Sep. 29, 2026

(54) METHOD AND SYSTEM FOR CONTROLLING CLEANING ROBOT

(71) Applicant: SAMSUNG ELECTRONICS CO., LTD., Suwon-si (KR)

(72) Inventors: Heesuk Yoon, Suwon-si (KR); Kiyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 18/793,234

(22) Filed: Aug. 2, 2024

(65) Prior Publication Data

US 2024/0389814 A1 Nov. 28, 2024

Related U.S. Application Data

(63) Continuation of application No. PCT/KR2023/001608, filed on Feb. 3, 2023.

(30) Foreign Application Priority Data

Feb. 4, 2022 (KR) ........................ 10-2022-0015081

(51) Int. Cl.
*A47L 9/28* (2006.01)
*A47L 9/30* (2006.01)
(Continued)

(52) U.S. Cl.
CPC ........... *A47L 9/2894* (2013.01); *A47L 9/2857* (2013.01); *A47L 9/30* (2013.01); *G16Y 10/75* (2020.01);
(Continued)

(58) Field of Classification Search
CPC .... A47L 9/2894; A47L 9/2857; A47L 9/2805; A47L 11/4011; G16Y 10/75;
(Continued)

(56) References Cited

U.S. PATENT DOCUMENTS 10,873,908 B2 12/2020 Chung et al.
11,392,346 B2 7/2022 Lee et al.
(Continued)

FOREIGN PATENT DOCUMENTS

CN 111716359 A 9/2020
CN 113693498 A * 11/2021 ............ B25J 13/003
(Continued)

OTHER PUBLICATIONS

CN113693498A English translation (Year: 2021).*
(Continued)

*Primary Examiner* — James J Lee
*Assistant Examiner* — Brandon S Lee
(74) *Attorney, Agent, or Firm* — STAAS & HALSEY LLP

(57) ABSTRACT

An operating method of a cleaning robot. More particularly, the operating method including: receiving, from a server device, a lock setting request to set the cleaning robot to a lock state; setting the cleaning robot to the lock state by inactivating an operation button of the cleaning robot or inactivating a voice recognition function of the cleaning robot, based on the lock setting request; providing information indicating that the cleaning robot is in the lock state; and based on a user input to release the cleaning robot from the lock state being identified, restarting the cleaning robot in a lock release state.

15 Claims, 20 Drawing Sheets

(51) Int. Cl.
*G10L 15/22* (2006.01)
*G16Y 10/75* (2020.01)
*G16Y 40/50* (2020.01)

(52) U.S. Cl.
CPC .............. *G16Y 40/50* (2020.01); *G10L 15/22* (2013.01); *G10L 2015/223* (2013.01)

(58) Field of Classification Search
CPC ... G16Y 40/50; G10L 15/22; G10L 2015/223; G06F 3/048; G06F 21/30; G06F 21/305; H04W 12/06
See application file for complete search history.

(56) References Cited

U.S. PATENT DOCUMENTS

| | | | |
|---|---|---|---|
| 11,517,168 | B2 | 12/2022 | Kim et al. |
| 2017/0195424 | A1 | 7/2017 | Nasir et al. |
| 2017/0364048 | A1 | 12/2017 | Park et al. |
| 2018/0202093 | A1 | 7/2018 | Park et al. |
| 2021/0064019 | A1 | 3/2021 | Choi et al. |
| 2021/0129870 | A1 | 5/2021 | Jung |
| 2021/0360849 | A1 | 11/2021 | Yu et al. |

FOREIGN PATENT DOCUMENTS

| | | | |
|---|---|---|---|
| JP | 2008-48129 | 2/2008 | |
| JP | 2020-95720 | 6/2020 | |
| KR | 10-0542500 | 1/2006 | |
| KR | 10-2013-0039622 | 4/2013 | |
| KR | 20130039622 A * | 4/2013 | ........... A47L 9/2805 |
| KR | 10-1324168 | 11/2013 | |
| KR | 10-2014-0032262 | 3/2014 | |
| KR | 10-1708301 | 2/2017 | |
| KR | 10-1797493 | 11/2017 | |
| KR | 10-1836351 | 3/2018 | |
| KR | 10-2018-0038885 | 4/2018 | |
| KR | 10-2018-0127688 | 11/2018 | |
| KR | 10-2019-0042931 | 4/2019 | |
| KR | 10-2021-0026974 | 3/2021 | |
| KR | 10-2021-0033848 | 3/2021 | |
| KR | 10-2021-0055142 | 5/2021 | |
| KR | 10-2249808 | 5/2021 | |

OTHER PUBLICATIONS

KR20130039622A English translation (Year: 2013).*
International Search Report dated Apr. 28, 2023 for corresponding application PCT/KR2023/001608.
Written Opinion dated Apr. 28, 2023 for corresponding application PCT/KR2023/001608.
Office Action dated Apr. 9, 2026, issued in Korean Application No. 10-2022-0015081.

* cited by examiner

METHOD AND SYSTEM FOR CONTROLLING CLEANING ROBOT

CROSS-REFERENCE TO RELATED APPLICATION

This application is a continuation application, under 35 U.S.C. § 111 (a), of international application No. PCT/KR2023/001608, filed on Feb. 3, 2023, which claims priority under 35 U. S. C. § 119 to Korean Patent Application No. 10-2022-0015081 filed on Feb. 4, 2022, the disclosures of which are incorporated herein by reference in their entireties.

TECHNICAL FIELD

Embodiments of the present disclosure relate to a cleaning robot, a cleaning robot operating method, and a computer-readable recording medium having recorded thereon a program for performing the cleaning robot operating method, on a computer.

BACKGROUND ART

Internet of Things (IoT) is the base technology and service of a hyper-connected society and the next-generation Internet. IoT is defined as Internet of Things or Internet of Objects, and refers to an environment in which information generated by uniquely identifiable objects is shared through the Internet.

Internet-connected devices (e.g., IoT devices) use their built-in sensors to collect data, and operate according to the data. IoT devices are useful for improving the way people work and live. IT devices are being applied in various fields, from smart home devices that automatically control heating and lighting to smart factories that monitor industrial equipment to automatically find and resolve issues.

Cleaning robots may also be used as IoT devices. For example, in a case where a cleaning robot is connected to the Internet, a user may remotely control the cleaning robot by using a mobile device. Recently, the use of cleaning robots has been increasing.

DISCLOSURE

Technical Problem

Embodiments of the present disclosure aim for a cleaning robot to efficiently complete a cleaning work within a cleaning space, by remotely setting or releasing a lock function of the cleaning robot by using a mobile device.

Technical Solution

According to an aspect of an embodiment of the present disclosure, an operating method of a cleaning robot may include: receiving, from a server device, a lock setting request to set the cleaning robot to a lock state; setting the cleaning robot to the lock state by inactivating an operation button of the cleaning robot or inactivating a voice recognition function of the cleaning robot, based on the lock setting request; providing information indicating that the cleaning robot is in the lock state; and based on a user input to release the cleaning robot from the lock state being identified, restarting the cleaning robot in a lock release state.

According to another aspect of an embodiment of the present disclosure, a cleaning robot may include: a communication interface configured to wirelessly transmit or receive data by accessing a preset network; a memory to store one or more instructions; and at least one processor connected to the memory, wherein the at least one processor is configured to execute the one or more instructions for: receiving, from a server device, a lock setting request to set the cleaning robot to a lock state; setting the cleaning robot to the lock state by inactivating an operation button of the cleaning robot, based on the lock setting request; providing information indicating that the cleaning robot is in the lock state; and based on a user input to release the cleaning robot from the lock state being identified, restarting the cleaning robot in a lock release state.

According to another aspect of an embodiment of the present disclosure, provided is a computer-readable recording medium having recorded thereon a program for performing the operating method of the cleaning robot, on a computer.

MODE FOR INVENTION

Figure 1:
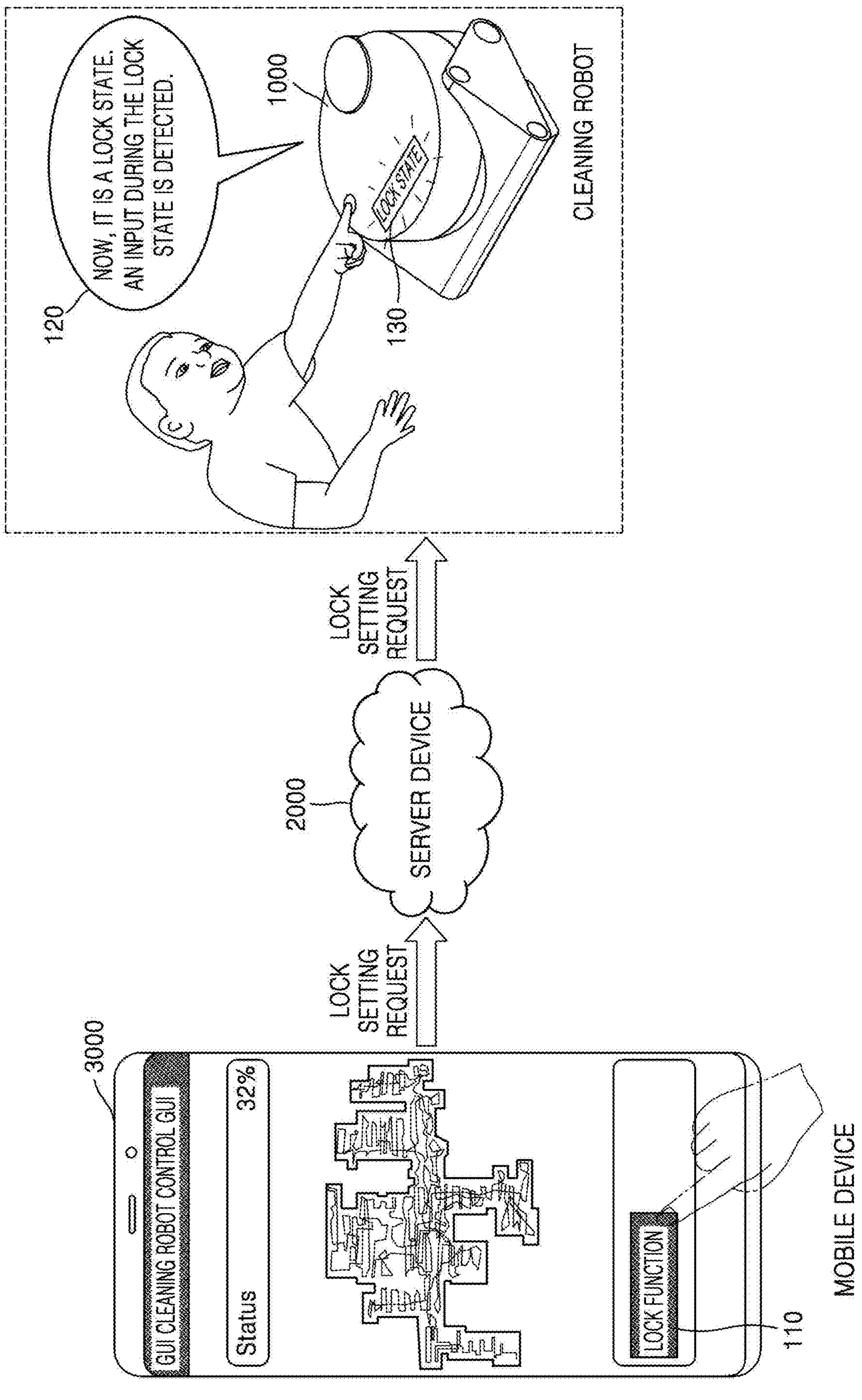
FIG. 1 is a diagram for describing a system for controlling a cleaning robot according to an embodiment of the present disclosure.

Hereinafter, an embodiment of the present disclosure will now be described more fully with reference to the accompanying drawings for one of ordinary skill in the art to be able to perform the embodiment without any difficulty. The present disclosure may, however, be embodied in many different forms and should not be construed as being limited to the embodiment set forth herein. In the drawings, for a more clear description of the present disclosure, parts or units that are not related to the present disclosure are omitted, and regarding descriptions of the drawings, similar or related elements are referenced similar reference numerals.

Although the terms used in embodiments of the present disclosure are selected from among common terms that are currently widely used in consideration of their functions in the present disclosure, the terms may vary according the intention of one of ordinary skill in the art, a precedent, or the advent of new technology. Also, in particular cases, the terms are discretionally selected by the applicant of the present disclosure, and the meaning of those terms will be described in detail in the corresponding part of the detailed description. Therefore, the terms used in the present disclosure are not merely designations of the terms, but the terms are defined based on the meaning of the terms and content throughout the present disclosure. Various embodiments of the present document and terms used therein are not intended to limit technical features of the present document to particular embodiments, and it is to be appreciated that all changes, equivalents, or substitutes of the embodiments are included therein.

As used herein, the singular forms are intended to include the plural forms as well, unless the context clearly indicates otherwise. In the present disclosure, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

According to various embodiments, each element (e.g., a module or a program) of elements described above may include a singular object or a plurality of objects, and some of the plurality of objects may be distributed in other element. According to various embodiments, one or more elements or operations may be omitted from among the above-described corresponding elements, or one or more other elements or operations may be added. Alternatively or additionally, a plurality of elements (e.g., modules or programs) may be integrated into one element. In this case, the integrated element may perform one or more functions of each element of the plurality of element identically or similarly to those performed by the corresponding element among the plurality of element prior to integration. According to various embodiments, operations performed by the module, the program, or another element may be executed sequentially, in parallel, repeatedly, or heuristically, one or more operations of the operations may be executed in a different order or omitted, or one or more other operations may be added.

Throughout the specification, a term such as "... module" or "... unit" may refer to a unit configured to process at least one function or operation, may include a unit implemented as hardware, software, or firmware, and may be interchangeably used with a term such as logic, a logic block, a part, or a circuit. The "module" may be an integrated component, or a portion or a minimum unit of the integrated component which performs one or more functions. For example, according to an embodiment, the "module" may be implemented in the form of an application-specific integrated circuit (ASIC).

Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

The expression "configured to (or set to)" used in the specification may be replaced with, for example, "suitable for," "having the capacity to," "designed to," "adapted to," "made to," or "capable of" according to cases. The expression "configured to (or set to)" may not necessarily mean "specifically designed to" in a hardware level. Instead, in some cases, the expression "system configured to ..." may mean that the system is "capable of ..." along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory.

Hereinafter, the present disclosure will now be described in detail with reference to the accompanying drawings.

FIG. 1 is a diagram for describing a system for controlling a cleaning robot according to an embodiment of the present disclosure.

Referring to FIG. 1, a system for controlling a cleaning robot (hereinafter, the cleaning robot control system) according to an embodiment of the present disclosure may include a cleaning robot 1000, a server device 2000, and a mobile device 3000. However, not all shown elements are necessary elements. The cleaning robot control system may be implemented with more elements than the shown elements or may be implemented with fewer elements than the shown elements.

The cleaning robot 1000 according to an embodiment of the present disclosure is a robot device capable of autonomously moving using wheels and performing a cleaning operation while moving in a cleaning space. The cleaning space may be, for example, a space such as a house, an office, or the like which requires cleaning.

According to an embodiment of the present disclosure, the cleaning robot 1000 may receive a voice signal that is an analog signal via a microphone, and may convert the voice part into a computer-readable text by using an automatic speech recognition (ASR) model. The cleaning robot 1000 may interpret the converted text by using a natural language understanding (NLU) model, and thus, may obtain an intention of user's utterance. Here, the ASR model or the NLU model may be an artificial intelligence (AI) model. The AI model may be processed by an AI-dedicated processor designed in a hardware structure specialized for processing an AI model. The AI model may be generated via a training process. Here, being generated via a training process may mean that predefined operation rules or AI models set to perform desired characteristics (or purposes) are generated by training a basic AI model by using a learning algorithm that utilizes a large amount of training data. The AI model may include a plurality of neural network layers. Each of the neural network layers may include a plurality of weight values, and may perform a neural network arithmetic operation via an arithmetic operation between an arithmetic operation result of a previous layer and the plurality of weight values.

Linguistic understanding is a technology to recognize and apply/process human language/characters and includes natural language processing, machine translation, dialogue systems, question answering, speech recognition/synthesis, and the like.

The cleaning robot 1000 according to an embodiment of the present disclosure may communicate with the mobile device 3000 via Wi-Fi communication. Also, the cleaning robot 1000 and the mobile device 3000 according to an embodiment of the present disclosure may perform Wi-Fi communication with an access point (AP) device, and may access a network via the AP device. Also, the cleaning robot 1000 and the mobile device 3000 according to an embodiment of the present disclosure may access the network via the AP device, and thus, may access the server device 2000.

The cleaning robot 1000 according to an embodiment of the present disclosure may access the network via the AP device, and thus, may access the server device 2000. The cleaning robot 1000 according to an embodiment of the present disclosure may access the server device 2000, and may be registered in the server device 2000. That the cleaning robot 1000 is registered in the server device 2000 may mean that device information (a model name, a serial number, a manufacture date, etc.) of the cleaning robot 2000, user account information of the cleaning robot 1000, network information (IP address, etc.) of the cleaning robot 2000, or the like are stored in the server device 2000. Accordingly, a user logged in via a user account in an application executed in the mobile device 3000 may deliver a command for controlling the cleaning robot 2000 to the server device 2000, and the server device 2000 may deliver the control command to the cleaning robot 1000 according to network information of the cleaning robot 1000.

Also, the cleaning robot 1000 is managed as a device of a preset account, and thus, may be monitored by the mobile device 3000 logged in a connected account. For example, state information such as cleaning state information, battery remaining amount information, or the like of the cleaning robot 1000 may be provided to the server device 2000 via the AP device, and the mobile device 3000 logged in an account connected to the server device 2000 may check the state information such as the cleaning state information, the battery remaining amount information, or the like of the cleaning robot 1000.

In this manner, the user of the mobile device 3000 may check the state information of the cleaning robot 1000 by logging in the preset account of the server device 2000 by using the mobile device 3000 or may control an operation of the cleaning robot 1000 via the mobile device 3000. For example, the mobile device 3000 may log in the server device 2000 via the AP device, and thus, may check map data including current cleaning state information of the cleaning robot 1000 or a battery remaining amount of the cleaning robot 1000 or may directly control the cleaning robot 1000. However, in a case of a normal cleaning robot, a user may check a state of the cleaning robot or may control an operation of the cleaning robot via the mobile device 3000, but the normal cleaning robot does not provide a lock function for remotely inactivating direct control of the cleaning robot 1000 by using the mobile device 3000.

While the normal cleaning robot does not provide a function of remotely performing locking by using the mobile device 3000, it is possible to set or release a lock function of the cleaning robot via a lock button (e.g., a lock setting button or a lock release button) mounted at a main body of the cleaning robot. That is, in order to prevent a case in which an operation button of the cleaning robot is incorrectly input due to various factors until cleaning is completed in a cleaning space, a user of the cleaning robot may set the lock function with respect to the operation button of the cleaning robot by using the lock setting button mounted at the main body of the cleaning robot. However, in a case where the lock function is set or released via the lock setting button or the lock release button which is a physical button mounted at the main body of the cleaning robot, there is a possibility that the lock function of the cleaning robot may be set or released in a situation the user does not desire.

For example, a user who is not well aware of how to use the cleaning robot may incorrectly press the lock setting button mounted at the main body while manipulating main body buttons to control an operation of the cleaning robot. In this case, an undesired lock function may be set to the cleaning robot, and a difficult situation may occur as the user who is not well aware of how to use the cleaning robot does not know how to release the lock function.

Alternatively, while the cleaning robot set with the lock function is performing cleaning, the lock release button mounted at the main body of the cleaning robot is incorrectly input by a child or a pet, such that the lock function set to the cleaning robot may be undesirably released.

As described above, when the cleaning robot sets or releases the lock function due to an input to the lock setting button or the lock release button which is the physical button mounted at the main body of the cleaning robot, there is a problem in which the cleaning robot may not correctly perform a cleaning robot's own lock function.

Therefore, according to an embodiment of the present disclosure, disclosed is a technology by which the cleaning robot 1000 is not set/released with respect to the lock function via the physical button (the lock setting button or the lock release button) mounted at the main body of the cleaning robot but is set and released with respect to the lock function for the cleaning robot 1000 remotely via the mobile device 3000.

The mobile device 3000 according to an embodiment of the present disclosure may deliver a lock setting request for setting the cleaning robot 1000 to a lock state to the cleaning robot 1000. In FIG. 1, it is shown that the lock setting request is delivered to the cleaning robot 1000 via the server device 2000. However, when the mobile device 3000 directly communicates with the cleaning robot 1000 via Wi-Fi connection, the lock setting request may be directly delivered from the mobile device 3000 to the cleaning robot 1000. Hereinafter, it is described that the mobile device 3000 communicates with the cleaning robot 1000 via the server device 2000.

When the mobile device 3000 according to an embodiment of the present disclosure receives a user input with respect to a lock function button 110 displayed on a cleaning robot control graphical user interface (GUI), the mobile device 3000 may deliver the lock setting request to the server device 2000. When the server device 2000 according to an embodiment of the present disclosure receives the lock setting request, the server device 2000 may deliver the received lock setting request to the cleaning robot 1000. When the cleaning robot 1000 according to an embodiment of the present disclosure receives the lock setting request, the cleaning robot 1000 may inactivate an operation button for directly controlling the cleaning robot 1000 or may inactivate a voice recognition function, thereby setting the cleaning robot 1000 to a lock state.

When the cleaning robot 1000 according to an embodiment of the present disclosure is set to the lock state, the cleaning robot 1000 may display that the cleaning robot 1000 is currently in the lock state, via a voice or a light-emitting diode (LED) display. According to an embodiment of the present disclosure, when the cleaning robot 1000 set to the lock state receives an input of an operation button from a user, the cleaning robot 1000 may display that it cannot perform an operation corresponding to the input operation button, via a voice or the LED display. According to an embodiment of the present disclosure, when the cleaning robot 1000 set to the lock state receives a voice command for controlling an operation of the cleaning robot 1000 from a user, the cleaning robot 1000 may display that it cannot perform an operation corresponding to the voice command, via a voice or the LED display.

For example, in a case where a baby touches an operation button of the cleaning robot 1000 when the cleaning robot 1000 set to the lock state performs a cleaning function, the cleaning robot 1000 may guide that the cleaning robot 1000 is currently in the lock state, via a voice ("Now, it is a lock state. An input during the lock state is detected.") 120, or may display and guide on a LED display 130.

According to an embodiment of the present disclosure, when the cleaning robot 1000 identifies an input to a reset button mounted at the main body of the cleaning robot 1000, the cleaning robot 1000 may restart the cleaning robot 1000 while the lock state of the cleaning robot 1000 is released. Therefore, when a user attempts to release the lock state set to the cleaning robot 1000, the user may simply release the lock state set to the cleaning robot 1000 without using the mobile device 3000.

According to an embodiment of the present disclosure, the user may release the lock state of the cleaning robot 1000 via the mobile device 3000. When the mobile device 3000 according to an embodiment of the present disclosure receives a lock release request from the user, the mobile device 3000 may deliver the received lock release request to the server device 2000. The server device 2000 may deliver the received lock release request to the cleaning robot 1000, and the cleaning robot 1000 may release the lock state by activating the operation button of the cleaning robot 1000, in response to the received lock release request.

According to an embodiment of the present disclosure, when the cleaning robot 1000 is registered in a plurality of accounts, the lock state of the cleaning robot 1000 may be validly released only when a user account that generated the lock setting request generates the lock release request. For example, when user A set a lock state of the cleaning robot 1000, only user A can release the lock state of the cleaning robot 1000, and user B cannot release the lock state of the cleaning robot 1000.

According to an embodiment of the present disclosure, based on a network state between the cleaning robot 1000 and the server device 2000, when a network speed or a network signal strength between the cleaning robot 1000 and the server device 2000 remains at a threshold value or less for a threshold time or more, a lock state of the cleaning robot 1000 may be automatically released.

According to an embodiment of the present disclosure, when the cleaning robot 1000 is deleted from an account of the server device 2000, a lock state of the cleaning robot 1000 may be automatically released.

An embodiment related to releasing of a lock state of the cleaning robot 1000 will be described in detail with reference to FIGS. 8 to 13.

Figure 2:
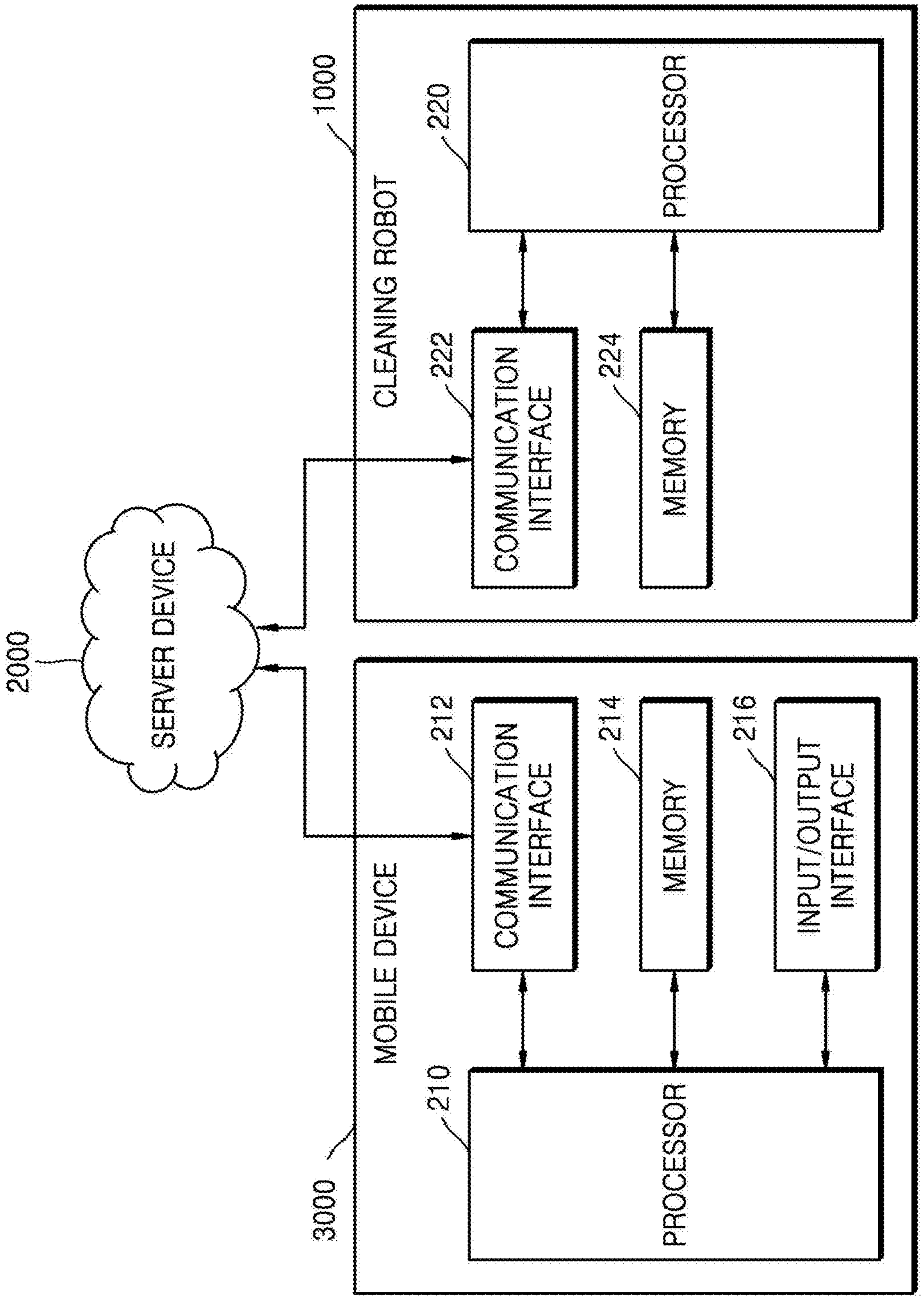
FIG. 2 is a diagram illustrating a cleaning robot, a mobile device, and a server device according to an embodiment of the present disclosure.

FIG. 2 is a diagram illustrating a cleaning robot, a mobile device, and a server device according to an embodiment of the present disclosure.

According to an embodiment of the present disclosure, the cleaning robot 1000 may include a processor 220, a communication interface 222, and a memory 224.

The cleaning robot 1000 is a robot device capable of autonomously moving by using wheels, etc., and may perform a cleaning operation while moving in a cleaning space. The cleaning robot 1000 may explore an indoor space by using at least one sensor, and may generate an indoor space map. The indoor space may indicate an area in which the cleaning robot 1000 practically moves freely. The indoor space map may include data about at least one of a navigation map used in driving during cleaning, a simultaneous localization and mapping (SLAM) map used in location recognition, and an obstacle recognition map on which information about a recognized obstacle is recorded.

The cleaning robot 1000 may include an AI processor. The AI processor may be manufactured in the form of a dedicated hardware chip for AI, or may be manufactured as part of an existing general-purpose processor (e.g., a central processing unit (CPU) or an application processor) or a dedicated graphics processor (e.g., a graphics processing unit (GPU)), and then mounted on the cleaning robot 1000.

The processor 220 controls all operations of the cleaning robot 1000. The processor 220 may be implemented as one or more processors. The processor 220 may perform a preset operation by executing an instruction or a command which is stored in the memory 224. Also, the processor controls operations of elements included in the cleaning robot 1000.

The communication interface 222 may communicate with an external device by wire or wirelessly. The communication interface 222 communicates with the mobile device 3000 and the server device 2000. The communication interface 222 may communicate with the mobile device 3000 by using a short-range communication scheme. For example, the communication interface 222 communicates with the mobile device 3000 via Bluetooth or Wi-Fi communication connection. Also, the communication interface 222 may communicate with the server device 2000 by using a long-range communication scheme. For example, the communication interface 222 communicates with the AP device via Wi-Fi, and communicates with the server device 2000 via a long-range communication network connected to the AP device.

The communication interface 222 may include a wireless communication module (e.g.: a cellular communication module, a short-range communication module, or a global navigation satellite system (GNSS) communication module) or a wired communication module (e.g., a local area network (LAN) communication module or a power line communication module). Also, the communication interface 222 may perform short-range communication, and may use, for example, Bluetooth, Bluetooth low energy (BLE), near-field communication (NFC), a WLAN (Wi-Fi), ZigBee, infrared data association (IrDA) communication, Wi-Fi direct (WFD), ultra-wideband (UWB), Ant+ communication, or the like. As another example, the communication interface 222 may perform long-range communication, and may communicate with an external device via, for example, a legacy cellular network, a 5th-generation (5G) network, a next-generation communication network, the Internet, a computer network (e.g., LAN or WAN), or the like.

The communication interface 222 may establish communication with the mobile device 3000 and the server device 2000, according to control by the processor 220. Also, the communication interface 222 transmits a control signal and data to the mobile device 3000 and the server device 2000, or receives a control signal and data from the mobile device 3000 and the server device 2000.

The cleaning robot 1000 may be registered in a preset account registered in the server device 2000, and may communicate with the server device 2000. Also, the cleaning robot 1000 may communicate with the mobile device 3000 via communication connection such as Bluetooth, Wi-Fi, etc. According to an embodiment of the present disclosure, the cleaning robot 1000 may communicate with other home appliances via a home network.

The mobile device 3000 may include a processor 210, a communication interface 212, a memory 214, and an input/output interface 216.

The processor 210 controls all operations of the mobile device 3000. The processor 210 may be implemented as one or more processors. The processor 210 may perform a preset operation by executing an instruction or a command which is stored in the memory 214.

The communication interface 212 may communicate with an external device by wire or wirelessly. The communication interface 212 communicates with the cleaning robot 1000 and the server device 2000. The communication interface 212 may communicate with the cleaning robot 1000 via a short-range communication scheme. Also, the communication interface 212 may communicate with the server device 2000 by using a long-range communication scheme.

The communication interface 212 may include a wireless communication module (e.g.: a cellular communication module, a short-range communication module, or a GNSS communication module) or a wired communication module (e.g., a LAN communication module or a power line communication module). Also, the communication interface 212 may perform short-range communication, and may use, for example, Bluetooth, BLE, NFC, a WLAN (Wi-Fi), ZigBee, IrDA communication, WFD, UWB, Ant+ communication, or the like. As another example, the communication interface 212 may perform long-range communication, and may communicate with an external device via, for example, a legacy cellular network, a 5G network, a next-generation communication network, the Internet, a computer network (e.g., LAN or WAN), or the like.

The communication interface 212 may establish communication with the cleaning robot 1000 and the server device 2000, according to control by the processor 210. The communication interface 212 transmits a control signal and data to the cleaning robot 1000 or the server device 2000, or receives a control signal and data from the cleaning robot 1000 or the server device 2000.

The memory 214 stores various information, data, instructions, programs, etc. which are necessary for an operation of the mobile device 3000. The memory 214 may include at least one of a volatile memory or a non-volatile memory or a combination thereof. The memory 214 may include at least one type of storage medium from among flash memory, a hard disk, a multimedia card micro, a memory card (e.g., a secure digital (SD) or extreme digital (XD) memory card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. Also, the memory 214 may correspond to a web storage or a cloud server which performs a storage function on the Internet.

The memory 214 stores an application for controlling the cleaning robot 1000 or setting or releasing a lock state of the cleaning robot 1000. The processor 210 may execute the application to control the cleaning robot 1000, or to set or release a lock state of the cleaning robot 1000. The application provides registration of the cleaning robot 1000, monitoring, controlling, automation, voice assistant, lock state setting/releasing of the cleaning robot 1000, or the like. The memory 214 pre-stores the application, or receives, from a cloud server, and stores the application.

The input/output interface 216 may receive, from an external source (e.g., a user) of the mobile device 3000, a command or data to be used in an element (e.g., the processor 210) of the mobile device 3000. The input/output interface 216 may include, for example, a touch screen, a touch pad, a key, a microphone, a mouse, a keyboard, or a digital pen (e.g., a stylus pen). Also, the input/output interface 216 may include, for example, a display, a speaker, a vibration device, or the like.

The input/output interface 216 provides a GUI related to the application, and receives a user input input via the GUI. The input/output interface 216 has various resources, compared to an input/output interface of the cleaning robot 1000. For example, while the input/output interface 216 includes a touch screen, a key, a microphone, a speaker, a vibration device, etc., the cleaning robot 1000 may include only a limited number of keys, and a small display. Embodiments of the present disclosure receive a control input for controlling the cleaning robot 1000 by using the mobile device 3000 having various input/output resources, compared to the cleaning robot 1000.

Figure 3:
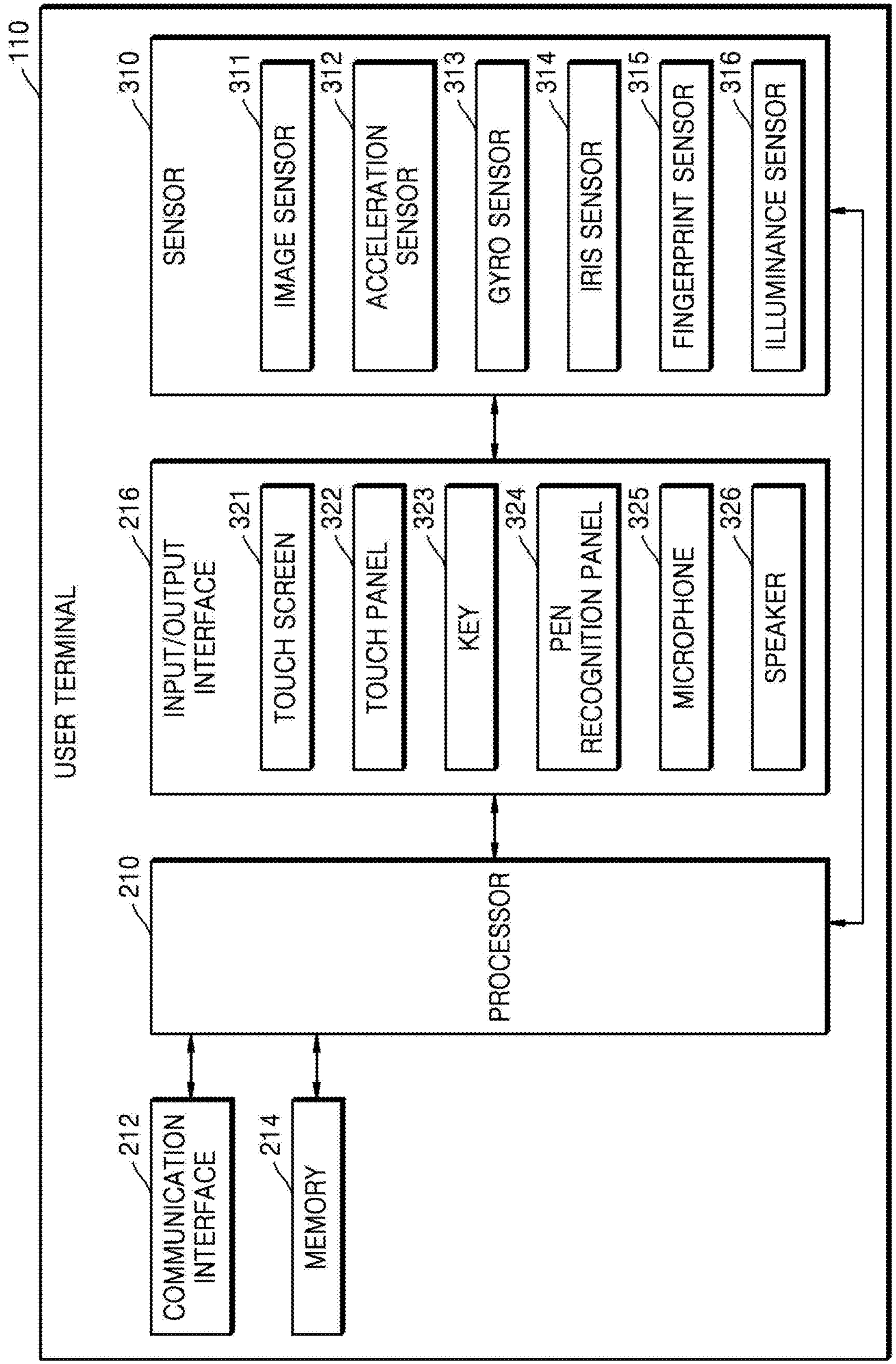
FIG. 3 is a diagram illustrating a structure of a mobile device according to an embodiment of the present disclosure.

FIG. 3 is a diagram illustrating a structure of a mobile device according to an embodiment of the present disclosure.

The mobile device 3000 according to an embodiment of the present disclosure includes the processor 210, the communication interface 212, the memory 214, the input/output interface 216, and a sensor 310. The mobile device 3000 may include various input/output resources and the sensor 310, compared to the cleaning robot 1000. For example, the input/output interface 216 may include a touch screen 321, a touch panel 322, a key 323, a pen recognition panel 324, a microphone 325, a speaker 326, or the like. The sensor 310 may include an image sensor 311, an acceleration sensor 312, a gyro sensor 313, an iris sensor 314, a fingerprint sensor 315, an illuminance sensor 316, or the like.

The mobile device 3000 may control the cleaning robot 1000 by using the input/output interface 216 and the sensor 310. The mobile device 3000 executes an application for controlling the cleaning robot 1000, and establishes communication connection to the cleaning robot 1000. The mobile device 3000 receives a control signal in various forms via the application. The control signal may be input via the touch screen 321, the touch panel 322, the key 323, the pen recognition panel 324, the microphone 325, or the like. Also, the mobile device 3000 provides an output in various forms via the application. The output of the application may be output via the touch screen 321, the speaker 326, or the like.

Figure 4:
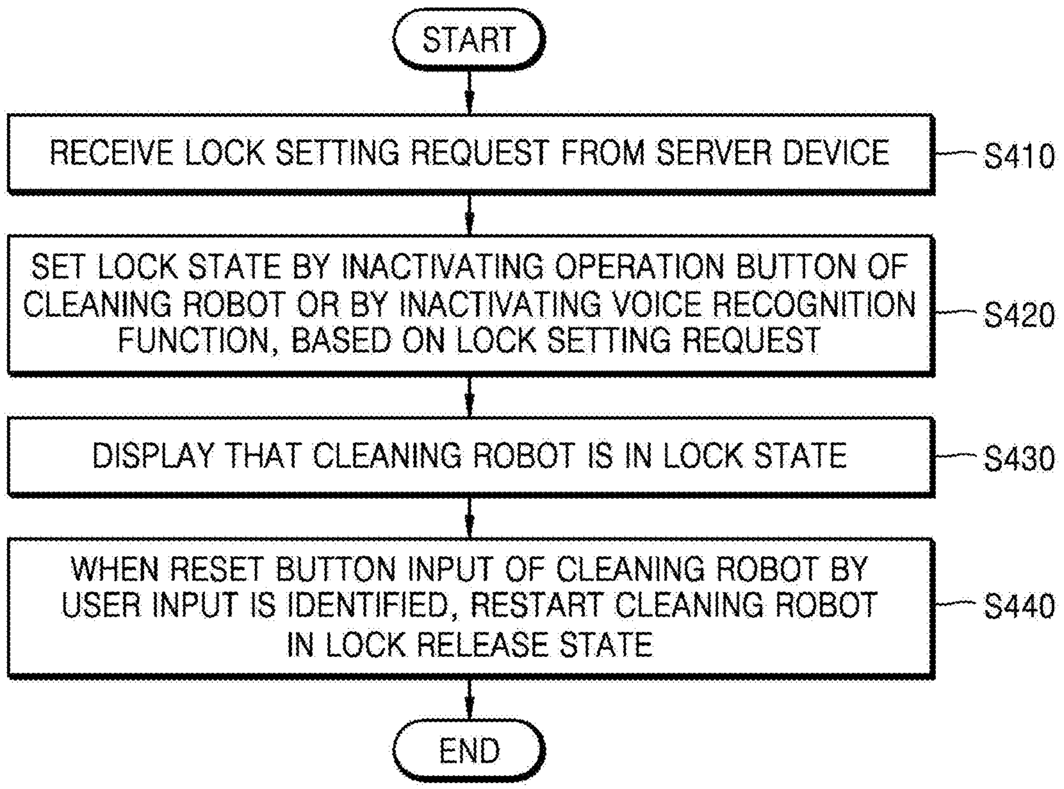
FIG. 4 is a flowchart illustrating an operating method of a cleaning robot, according to an embodiment of the present disclosure.

FIG. 4 is a flowchart illustrating an operating method of a cleaning robot, according to an embodiment of the present disclosure.

In operation S410, the cleaning robot 1000 according to an embodiment of the present disclosure may receive a lock setting request from the server device 2000.

The cleaning robot 1000 according to an embodiment of the present disclosure may receive the lock setting request from the server device 2000, and the lock setting request may be a request that has been delivered from the mobile device 3000 to the server device 2000.

When the mobile device 3000 according to an embodiment of the present disclosure receives a user input with respect to the lock function button 110 displayed on a cleaning robot control GUI, the mobile device 3000 may deliver the lock setting request to the server device 2000. When the server device 2000 according to an embodiment of the present disclosure receives the lock setting request, the server device 2000 may deliver the received lock setting request to the cleaning robot 1000.

The lock setting request according to an embodiment of the present disclosure may include an unconditional lock setting request and a conditional lock setting request. According to an embodiment of the present disclosure, the unconditional lock setting request may be a signal of requesting immediate setting of the cleaning robot 1000 to a lock state without a condition.

According to an embodiment of the present disclosure, a conditional lock setting request may be a signal of requesting setting of the cleaning robot 1000 to a lock state, under a particular condition. For example, the conditional lock setting request may be a request for allowing a particular user account to be set to a lock state so as to prevent the particular user account connected to the cleaning robot 1000 from manipulating the cleaning robot 1000. Also, for example, the conditional lock setting request may be a request for allowing the cleaning robot 1000 to be automatically set to a lock state when the cleaning robot 1000 is in a charging state. Also, for example, the conditional lock setting request may be a request for allowing the cleaning robot 1000 to be automatically set to a lock state during a particular time period (e.g., from 12:00 a.m. to 07:00 a.m.).

The mobile device 3000 according to an embodiment of the present disclosure may receive a user input of selecting the lock function button 110 displayed on the cleaning robot control GUI of the mobile device 3000, thereby displaying a lock function setting GUI. The mobile device 3000 according to an embodiment of the present disclosure may receive a user input with respect to an unconditional lock setting tab and a conditional lock setting tab which are displayed on the lock function setting GUI, and thus, may deliver an unconditional lock request or the conditional lock setting request to the cleaning robot 1000.

In operation S420, the cleaning robot 1000 according to an embodiment of the present disclosure may set the lock state by inactivating an operation button of the cleaning robot 1000 or by inactivating a voice recognition function of the cleaning robot 1000, based on the lock setting request.

That the cleaning robot 1000 according to an embodiment of the present disclosure sets the lock state may mean that the operation button mounted at the main body of the cleaning robot 1000 is inactivated or the voice recognition function of the cleaning robot 1000 is inactivated.

On a front surface or a rear surface of the main body of the cleaning robot 1000 according to an embodiment of the present disclosure, the operation button for controlling an operation of the cleaning robot 1000 may be mounted. When the cleaning robot 1000 according to an embodiment of the present disclosure receives the lock setting request, the cleaning robot 1000 may inactivate the operation button mounted at the main body, and thus, may set the cleaning robot 1000 to the lock state. According to an embodiment of the present disclosure, in a case where the cleaning robot 1000 is set to the lock state, even when a user touches or presses a particular operation button of the cleaning robot 1000, an operation of the cleaning robot 1000 which corresponds to the particular operation button may not occur.

The cleaning robot 1000 according to an embodiment of the present disclosure may receive a voice command for operation control of the cleaning robot 1000 via a microphone, may interpret a user's intention via the voice recognition function, and thus, may perform an operation corresponding to the voice command. When the cleaning robot 1000 according to an embodiment of the present disclosure receives the lock setting request, the cleaning robot 1000 may inactivate the voice recognition function of the cleaning robot 1000, thereby setting the cleaning robot 1000 to the lock state. According to an embodiment of the present disclosure, in a case where the cleaning robot 1000 is set to the lock state, even when the cleaning robot 1000 receives a voice command for controlling a particular operation of the cleaning robot 1000 from a user, as the voice recognition function is inactivated, the particular operation of the cleaning robot 1000 may not occur.

In operation S430, the cleaning robot 1000 according to an embodiment of the present disclosure may display that the cleaning robot 1000 is in the lock state.

When the cleaning robot 1000 according to an embodiment of the present disclosure is set to the lock state, the cleaning robot 1000 may display that the cleaning robot 1000 is currently in the lock state, via a voice or the LED display. According to an embodiment of the present disclosure, when the cleaning robot 1000 set to the lock state receives an input of an operation button from a user, the cleaning robot 1000 may display, to the user, that an operation corresponding to the input operation button cannot be performed, via a voice or the LED display. According to an embodiment of the present disclosure, when the cleaning robot 1000 set to the lock state receives a voice command for operation control of the cleaning robot 1000 from the user, the cleaning robot 1000 may display, to the user, that an operation corresponding to the voice command cannot be performed, via a voice or the LED display.

For example, when the cleaning robot 1000 set to the lock state performs a cleaning function, the cleaning robot 1000 in operation may contact a conductive object such as a curtain, and thus, a particular operation button may be incorrectly input. In this case, the cleaning robot 1000 may guide that the cleaning robot 1000 is currently in the lock state, via a voice or via guide displayed on the LED display.

In operation S440, when the cleaning robot 1000 according to an embodiment of the present disclosure identifies a reset button input of the cleaning robot 1000 by a user input, the cleaning robot 1000 may restart the cleaning robot 1000 while the lock state of the cleaning robot 1000 is released.

According to an embodiment of the present disclosure, a reset button may be mounted on a front surface or a rear surface of the cleaning robot 1000. According to an embodiment of the present disclosure, the reset button may be a button corresponding to a physical power of the cleaning robot 1000, and may be a button that is not inactivated even when the cleaning robot 1000 is set to the lock state.

When an input of the reset button from a user is identified, the cleaning robot 1000 according to an embodiment of the present disclosure may initialize setting of the cleaning robot 1000 and may restart power. Here, as setting of the cleaning robot 1000 is initialized, the lock state set to the cleaning robot 1000 may be released. Accordingly, when the cleaning robot 1000 according to an embodiment of the present disclosure identifies the reset button input, the cleaning robot 1000 may restart power while the lock state of the cleaning robot 1000 is released.

By doing so, when a user attempts to release the lock state set to the cleaning robot 1000, the user may simply release the lock state set to the cleaning robot 1000 without using the mobile device 3000.

Figure 5:
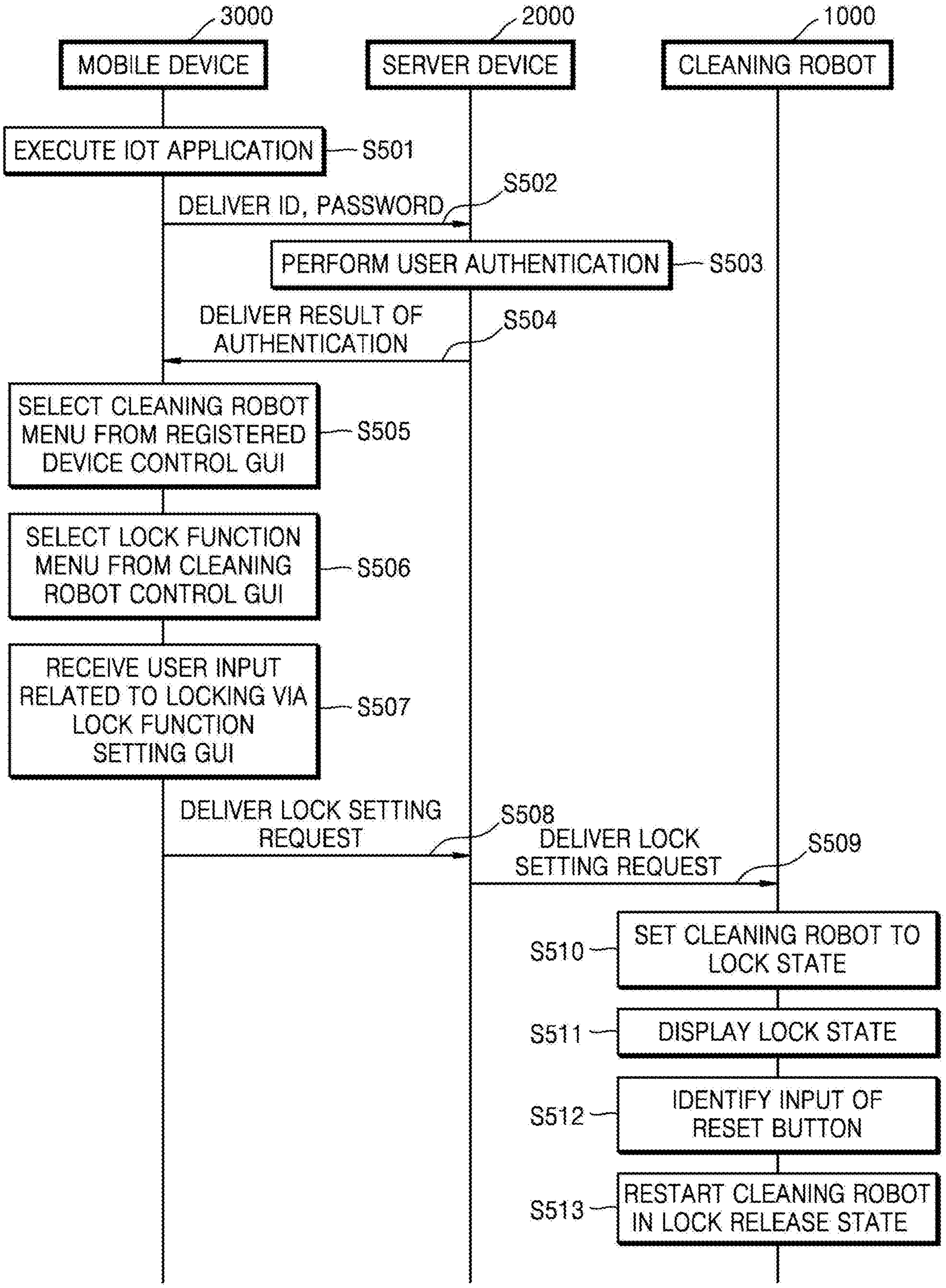
FIG. 5 is a flowchart for describing a method by which a cleaning robot receives a lock setting request from a mobile device, and thus, sets a lock state, according to an embodiment of the present disclosure.

FIG. 5 is a flowchart for describing a method by which a cleaning robot receives a lock setting request from a mobile device, and thus, sets a lock state, according to an embodiment of the present disclosure.

In operation S501, the mobile device 3000 according to an embodiment of the present disclosure may execute an IoT application, and in operation S502, may deliver an identification (ID) and a password for executing the IoT application to the server device 2000. The IoT application installed in the mobile device 3000 according to an embodiment of the present disclosure may be an application capable of providing a function of monitoring, controlling, automation, voice assistant, etc. of the cleaning robot 1000 registered in a preset account of the server device 2000.

In operation S503, the server device 2000 according to an embodiment of the present disclosure may perform user authentication, and in operation S504, may deliver a result of the authentication to the mobile device 3000. The server device 2000 according to an embodiment of the present disclosure may perform user authentication by checking whether the ID and the password delivered from the mobile device 3000 matches with an ID and a password stored in the server device 2000. When the server device 2000 according to an embodiment of the present disclosure performs user authentication and the mobile device 3000 is authenticated as a verified user, the result of the authentication may be delivered to the mobile device 3000. The server device 2000 according to an embodiment of the present disclosure may provide a cleaning robot control GUI to the mobile device 3000. According to an embodiment of the present disclosure, registered home appliances may be controlled via a registered device control GUI displayed on a display of the mobile device 3000. The cleaning robot 1000 according to an embodiment of the present disclosure may be a home appliance included in the registered home appliances that are controllable via the registered device control GUI.

In operation S505, the mobile device 3000 according to an embodiment of the present disclosure may receive a user input of selecting a cleaning robot menu from the registered device control GUI.

Figure 6:
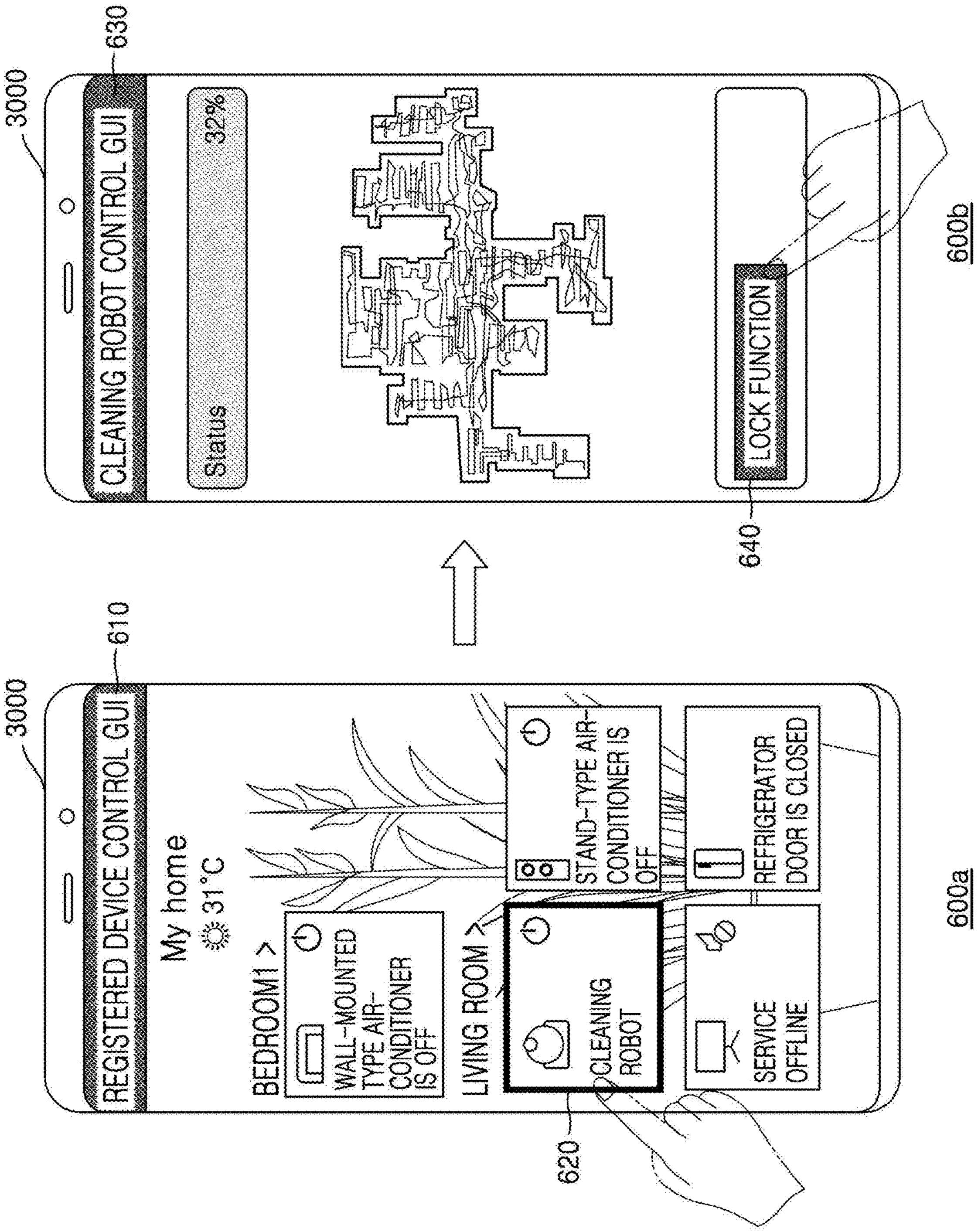
FIG. 6 is a diagram for describing a method by which a mobile device displays a cleaning robot control graphical user interface (GUI), according to an embodiment of the present disclosure.

Referring to 600*a* of FIG. 6, a registered device control GUI 610 may be displayed on the display of the mobile device 3000, and a user may control registered home appliances via the registered device control GUI. When the cleaning robot 1000 according to an embodiment of the present disclosure is registered, the cleaning robot 1000 may be controlled by selecting a cleaning robot 1000 menu 620 from the registered device control GUI 610. According to an embodiment of the present disclosure, the mobile device 3000 may receive a user input of selecting the cleaning robot 1000 menu 620 displayed on the registered device control GUI 610, and thus, may display a cleaning robot control GUI 630 on the display.

In operation S506, the mobile device 3000 according to an embodiment of the present disclosure may receive a user input of selecting a lock function menu from the cleaning robot control GUI.

Referring to 600*b* of FIG. 6, the cleaning robot control GUI 630 may be displayed on the display of the mobile device 3000, and battery remaining amount information, map data including current cleaning state information of the cleaning robot 1000, and a lock function menu 640 may be included in the cleaning robot control GUI 630. A user may select the lock function menu 640 displayed on the cleaning robot control GUI 630, thereby starting a series of processes for setting the cleaning robot 1000 to a lock state.

In operation S507, the mobile device 3000 according to an embodiment of the present disclosure may receive a user input related to locking of the cleaning robot 1000 via a lock function setting GUI.

Figure 7:
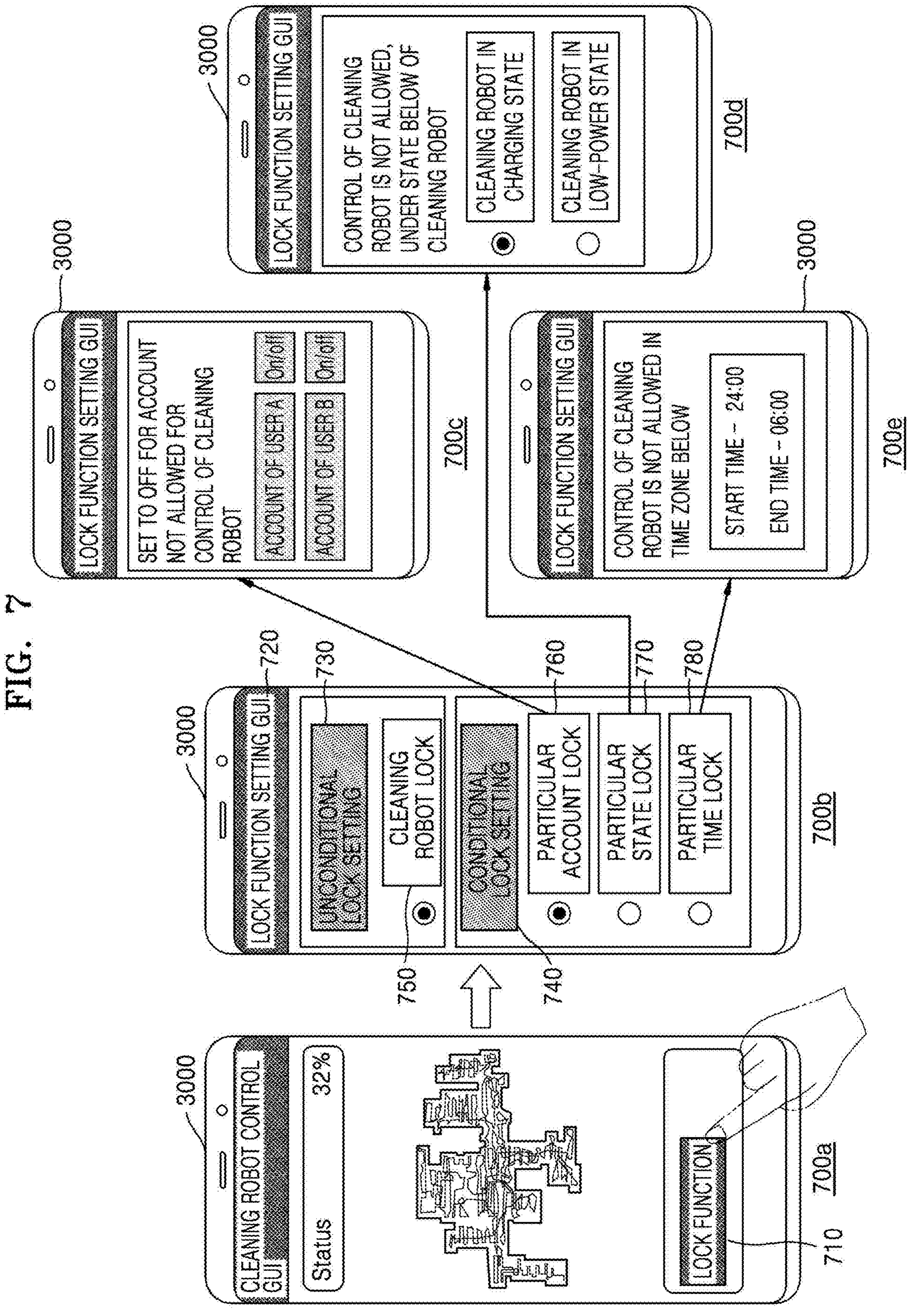
FIG. 7 is a diagram for describing a method of setting, by a mobile device, a cleaning robot to a lock state, according to an embodiment of the present disclosure.

Referring to 700*a* of FIG. 7, the cleaning robot control GUI displayed on the mobile device 3000 may include a lock function menu 710. The user may select the lock function menu 710 to set the cleaning robot 1000 to a lock state.

Referring to 700*b* of FIG. 7, the mobile device 3000 receives a user input of selecting the lock function menu 710, thereby displaying a lock function setting GUI 720 on the display. The lock function setting GUI 720 may include an unconditional lock setting menu 730 and a conditional lock setting menu 740. According to an embodiment of the present disclosure, unconditional lock setting may indicate that the cleaning robot 1000 is immediately set to a lock state without determining whether a particular condition is satisfied. According to an embodiment of the present disclosure, conditional lock setting may indicate that the cleaning robot 1000 is set to a lock state, under a particular condition.

According to an embodiment of the present disclosure, the mobile device 3000 may receive a user input of selecting a cleaning robot lock menu 750 from an unconditional lock setting menu 730, and thus, may deliver, to the server device 2000, a request for immediately setting the cleaning robot 1000 to a lock state.

According to an embodiment of the present disclosure, a conditional lock setting menu 740 may include a particular account lock menu 760, a particular state lock menu 770, and a particular time lock menu 780. According to an embodiment of the present disclosure, a user may select the particular account lock menu 760, and thus, may allow the cleaning robot 1000 to be set to the lock state with respect to a particular user account so as to prevent the particular user account connected to the cleaning robot 1000 from manipulating the cleaning robot 1000 According to an embodiment of the present disclosure, a user may select the particular state lock menu 770, and thus, may allow the cleaning robot 1000 to be set to the lock state when the cleaning robot 1000 satisfies a particular state condition. According to an embodiment of the present disclosure, a user may select the particular time lock menu 780, and thus, may allow the cleaning robot 1000 to be set to the lock state in a particular time zone.

Referring to 700*c* of FIG. 7, when the mobile device 3000 receives a user input of selecting the particular account lock menu 760, the mobile device 3000 may display, in a pop-up form, a lock setting screen with respect to a particular account on the display. According to an embodiment of the present disclosure, the lock setting screen may display a text "Please set OFF for an account that is not allowed for control of the cleaning robot 1000". When the cleaning robot 1000 is registered in all of an account of user A and an account of user B, and in order for a user of the cleaning robot 1000 to prevent the account of user A from manipulating the cleaning robot 1000, the user may touch an OFF selection button with respect to the account of user A. According to an embodiment of the present disclosure, when the mobile device 3000 receives a user input of touching the OFF selection button with respect to the account of user A, the mobile device 3000 may deliver, to the server device 2000, a request for setting the cleaning robot 1000 to a lock state with respect to the account of user A.

Referring to 700*d* of FIG. 7, when the mobile device 3000 receives a user input of selecting the particular state lock menu 770, the mobile device 3000 may display, in a pop-up form, a lock setting screen with respect to a particular state on the display. According to an embodiment of the present disclosure, the lock setting screen may display a text "Control of a cleaning robot is not allowed, under a state below of the cleaning robot." According to an embodiment of the present disclosure, the particular state may include a state in which the cleaning robot 1000 is being charged, and a state in which the cleaning robot 1000 is in a low power state, but the present disclosure is not limited thereto. According to an embodiment of the present disclosure, a user may perform an input of selecting the particular state displayed on the lock setting screen, and may perform a plurality of selections. For example, in a case where the mobile device 3000 receives a user input of selecting "A state in which a cleaning robot is charged", when the cleaning robot 1000 is charged, the mobile device 3000 may deliver, to the server device 2000, a request for setting the cleaning robot 1000 to a lock state.

Referring to 700*e* of FIG. 7, when the mobile device 3000 receives a user input of selecting the particular time lock menu 780, the mobile device 3000 may display, in a pop-up form, a lock setting screen with respect to a particular time on the display. According to an embodiment of the present disclosure, the lock setting screen may display a text "Control of a cleaning robot is not allowed in a time zone below." According to an embodiment of the present disclosure, a user of the cleaning robot 1000 may input, to the lock setting screen, a time zone during which the user wants the cleaning robot 1000 to be maintained in a lock state. For example, when the mobile device 3000 receives an input of a time zone "from 24:00 to 06:00", the mobile device 3000 may deliver, to the server device 2000, a request for setting the cleaning robot 1000 to a lock state in the time zone from 24:00 to 06:00.

In operation S508, the mobile device 3000 according to an embodiment of the present disclosure may deliver the lock setting request to the server device 2000. The lock setting request according to an embodiment of the present disclosure may include an unconditional lock setting request and a conditional lock setting request.

When the mobile device 3000 according to an embodiment of the present disclosure receives a user input of touching the cleaning robot lock menu 750 from the unconditional lock setting menu 730, the mobile device 3000 may transmit, to the server device 2000, the unconditional lock setting request for immediately setting the cleaning robot 1000 to a lock state.

The mobile device 3000 according to an embodiment of the present disclosure may receive a user input of setting a cleaning robot to a lock state under a particular condition, via the particular account lock menu 760, the particular state lock menu 770, or the particular time lock menu 780 of the conditional lock setting menu 740. In this case, the mobile device 3000 may transmit, to the server device 2000, the conditional lock setting request for setting the cleaning robot 1000 to a lock state under a particular condition.

In operation S509, the server device 2000 according to an embodiment of the present disclosure may deliver the received lock setting request to the cleaning robot 1000. According to an embodiment of the present disclosure, the lock setting request may include an unconditional lock setting request and a conditional lock setting request.

In operation S510, the cleaning robot 1000 according to an embodiment of the present disclosure may set the cleaning robot 1000 to the lock state, based on the lock setting request.

The cleaning robot 1000 according to an embodiment of the present disclosure may inactivate an operation button mounted at the main body of the cleaning robot 1000 or may inactivate a voice recognition function of the cleaning robot 1000, thereby setting the cleaning robot 1000 to the lock state. In a case where the cleaning robot 1000 according to an embodiment of the present disclosure is set to the lock state, even when a user touches or presses a particular operation button of the cleaning robot 1000, an operation of the cleaning robot 1000 which corresponds to the particular operation button may not occur. In a case where the cleaning robot 1000 according to an embodiment of the present disclosure is set to the lock state, even when the cleaning robot 1000 receives a voice command for control of a particular operation from a user, as the voice recognition function is inactivated, an operation of the cleaning robot 1000 which corresponds to the voice command may not occur.

In operation S511, the cleaning robot 1000 according to an embodiment of the present disclosure may display the lock state.

When the cleaning robot 1000 according to an embodiment of the present disclosure is set to the lock state, the cleaning robot 1000 may display, via a voice or the LED display, which the cleaning robot 1000 is set to the lock state. According to an embodiment of the present disclosure, when the cleaning robot 1000 set to the lock state receives an input of an operation button from a user, the cleaning robot 1000 may display that it cannot perform an operation corresponding to the input operation button, via a voice or the LED display.

Figure 8:
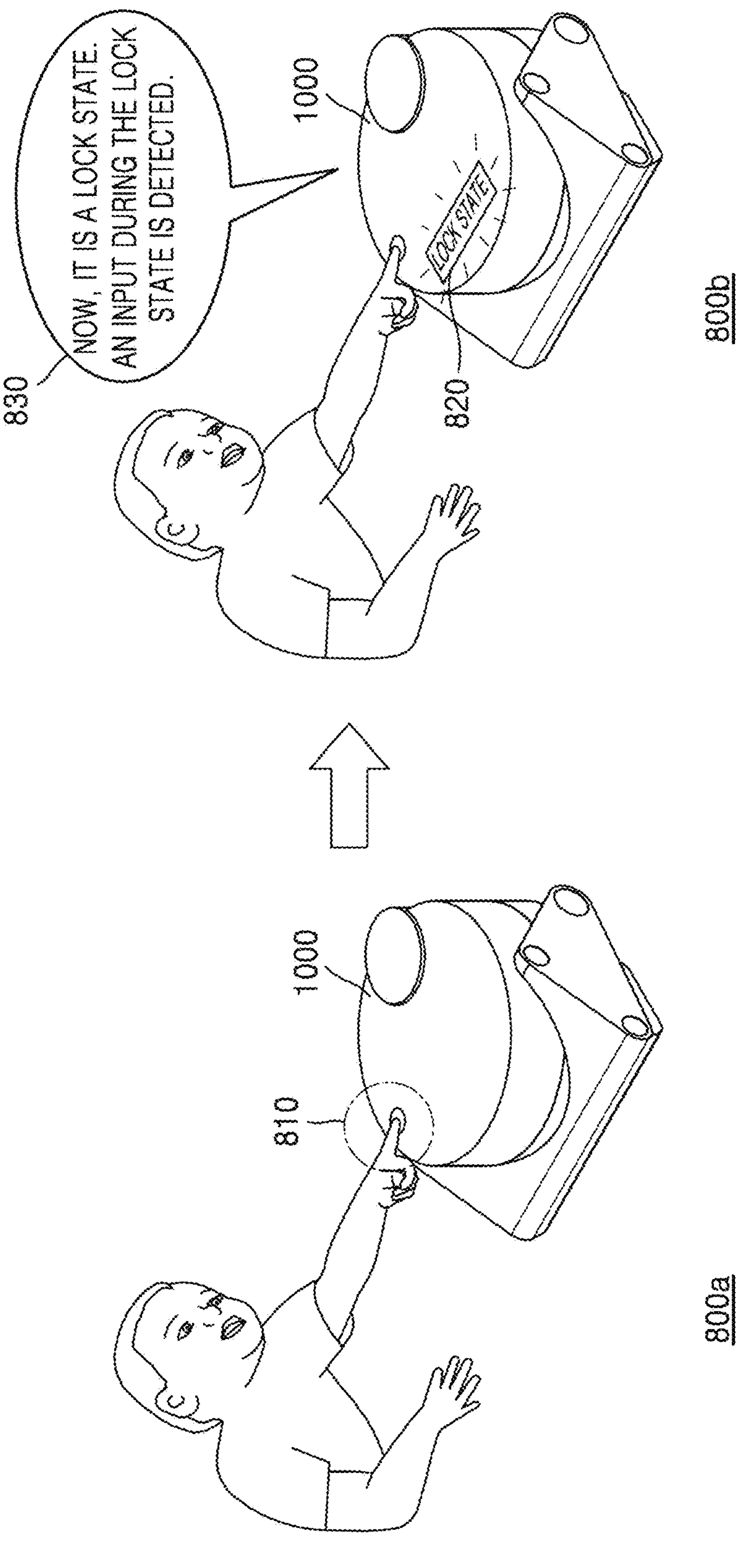
FIG. 8 is a diagram for describing a method of displaying a cleaning robot being set to a lock state, according to an embodiment of the present disclosure.

Referring to 800*a* of FIG. 8, while the cleaning robot 1000 set to the lock state is operating, a baby crawling on the floor may perform an input 810 of touching an operation button of the cleaning robot 1000. In this case, referring to 800*b* of FIG. 8, the cleaning robot 1000 may display that the cleaning robot 1000 in the lock state is currently operating, via an LED display 820, or may output a guide via a voice ("Now, it is a lock state. An input during the lock state is detected.") 830.

In operation S512, the cleaning robot 1000 according to an embodiment of the present disclosure may identify an input of a reset button.

Figure 9:
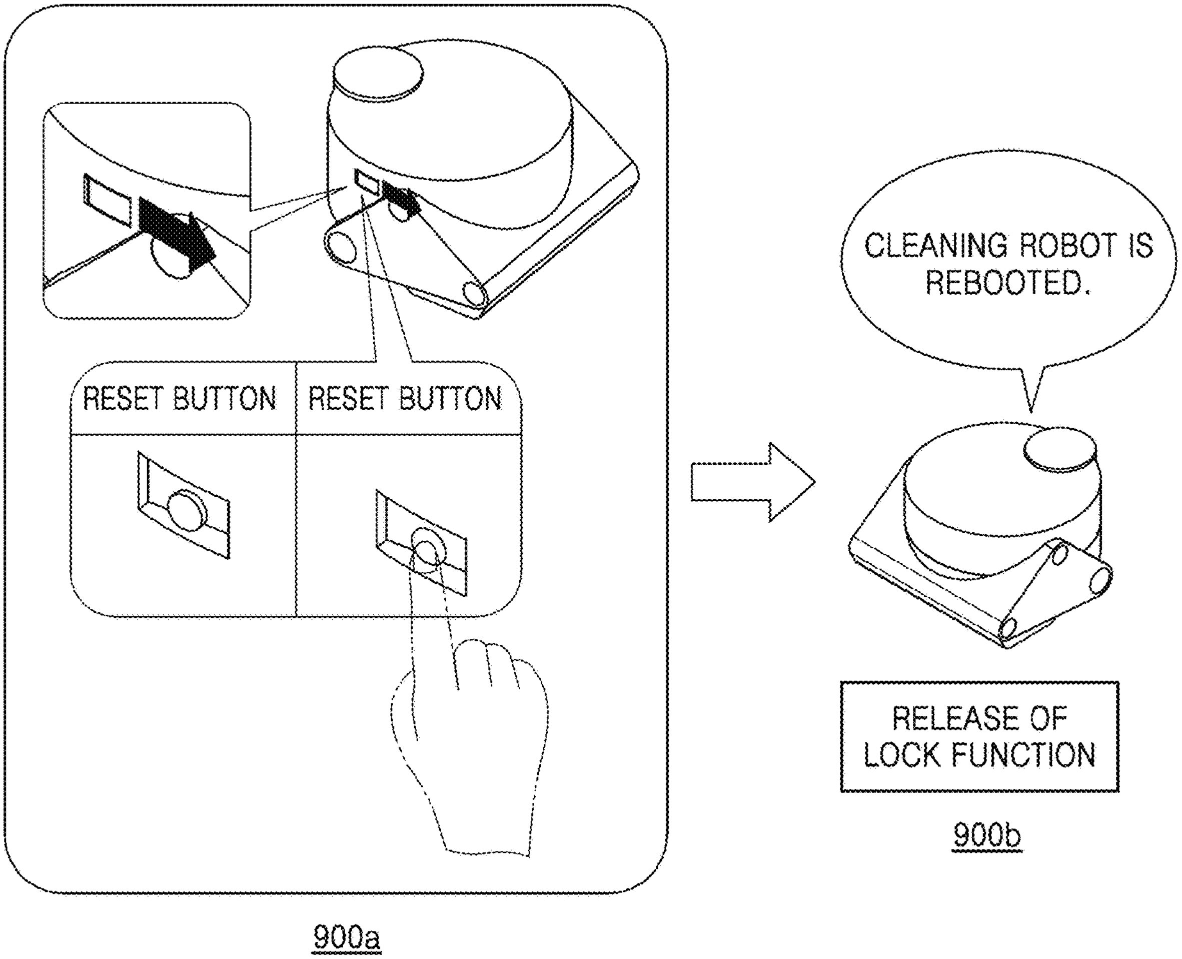
FIG. 9 is a diagram for describing a method of releasing a lock state of a cleaning robot via a reset button of the cleaning robot, according to an embodiment of the present disclosure.

Referring to 900*a* of FIG. 9, the reset button may be mounted on a front surface or a rear surface of the cleaning robot 1000. The reset button of the cleaning robot 1000 according to an embodiment of the present disclosure may be embedded in the cleaning robot 1000. The reset button according to an embodiment of the present disclosure is a button corresponding to a physical power of the cleaning robot 1000, and may not be inactivated even when the cleaning robot 1000 is set to a lock state. According to an embodiment of the present disclosure, in order to release the lock state of the cleaning robot 1000, a user may press the reset button mounted at the cleaning robot 1000.

In operation S513, the cleaning robot 1000 according to an embodiment of the present disclosure may restart the cleaning robot 1000 while the lock state of the cleaning robot 1000 is released.

When the cleaning robot 1000 according to an embodiment of the present disclosure identifies an input of the reset button from the user, the cleaning robot 1000 may release locking set to the cleaning robot 1000 and may restart power of the cleaning robot 1000. According to an embodiment of the present disclosure, when there is an input of the reset button of the cleaning robot 1000, all settings of the cleaning robot 1000 may be initialized. As setting of the cleaning robot 1000 is initialized, the lock state set to the cleaning robot 1000 may be released. Referring to 900*b* of FIG. 9, the cleaning robot 1000 may release the set lock state set, and may inform a user that power of the cleaning robot 1000 is restarted, via a voice "A cleaning robot is rebooted."

Figure 10:
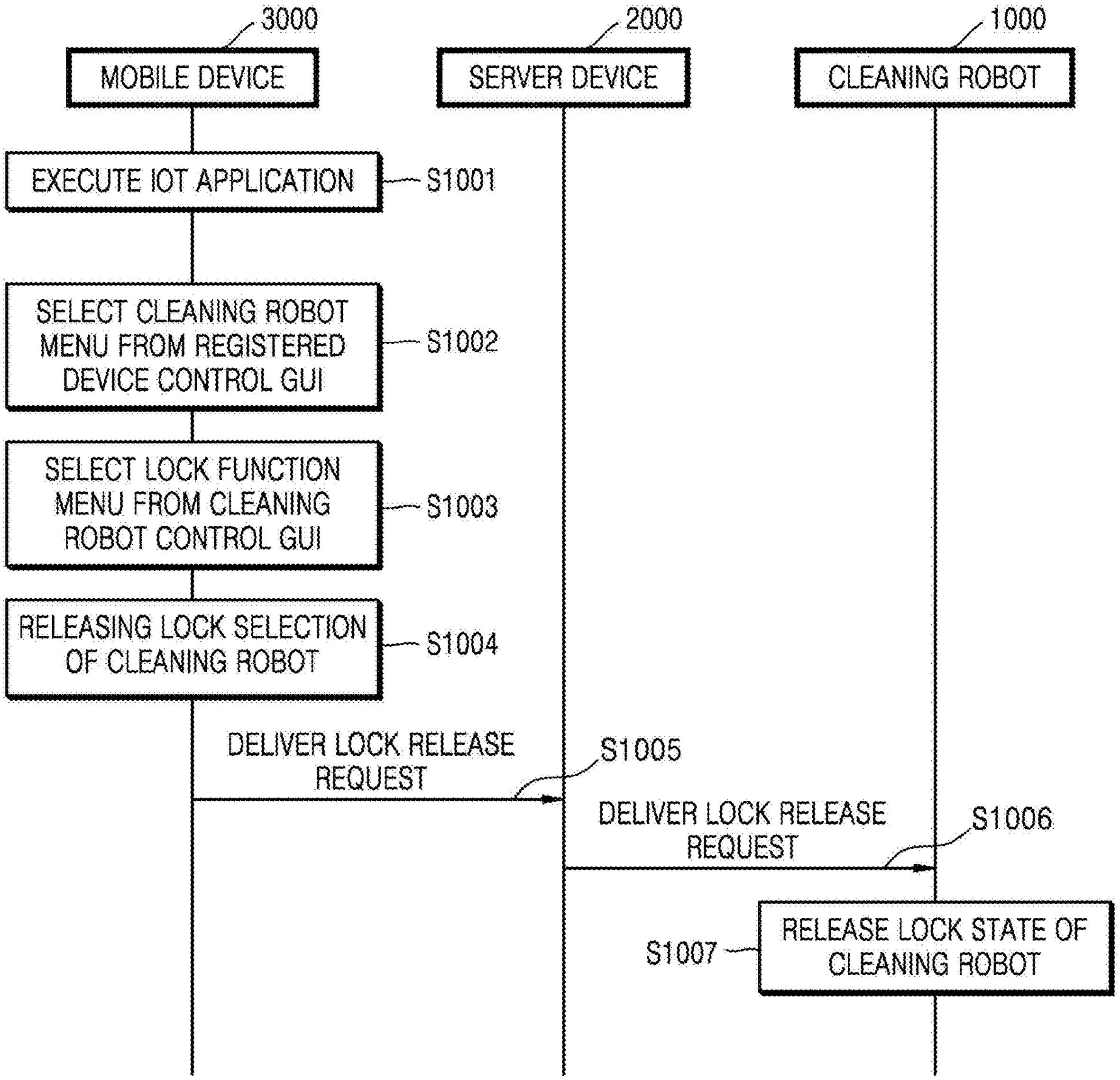
FIG. 10 is a flowchart for describing a method of releasing a lock state of a cleaning robot via a mobile device, according to an embodiment of the present disclosure.

FIG. 10 is a flowchart for describing a method of releasing a lock state of a cleaning robot via a mobile device, according to an embodiment of the present disclosure.

In operation S1001, the mobile device 3000 according to an embodiment of the present disclosure may execute an IoT application. When the mobile device 3000 according to an embodiment of the present disclosure executes the IoT application, the mobile device 3000 may display a registered device control GUI on the display.

In operation S1002, the mobile device 3000 according to an embodiment of the present disclosure may receive a user input of selecting a cleaning robot menu from the registered device control GUI.

According to an embodiment of the present disclosure, the registered device control GUI may be displayed on the display of the mobile device 3000, and a user may control the cleaning robot 1000 by selecting a cleaning robot 1000 menu displayed on the registered device control GUI. Here, as releasing of the lock state of the cleaning robot 1000 is also controlling of the cleaning robot 1000, the user may select the cleaning robot 1000 menu so as to release the lock state of the cleaning robot 1000. When the mobile device 3000 according to an embodiment of the present disclosure receives a user input of selecting the cleaning robot 1000 menu from the user, the mobile device 3000 may display a cleaning robot control GUI on the display.

In operation S1003, the mobile device 3000 according to an embodiment of the present disclosure may receive a user input of selecting a lock function menu 1120 from a cleaning robot control GUI 1110.

Figure 11:
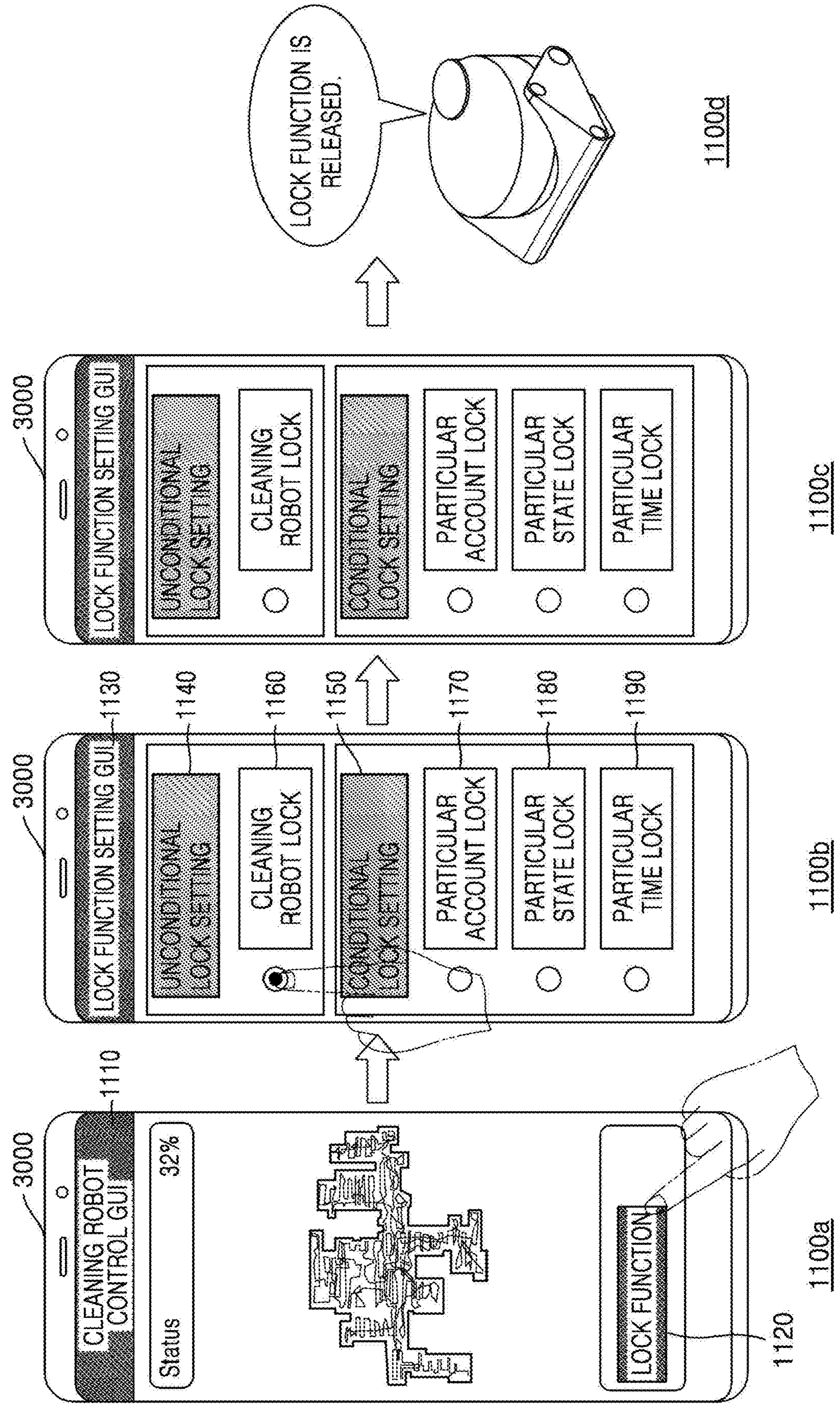
FIG. 11 is a diagram for describing a method of releasing, via a mobile device, a lock state of a cleaning robot, according to an embodiment of the present disclosure.

Referring to 1100*a* of FIG. 11, the cleaning robot control GUI 1110 may be displayed on the display of the mobile device 3000, and the cleaning robot control GUI may include battery remaining amount information, map data including current cleaning state information, and the lock function menu 1120. The user may release the lock state of the cleaning robot 1000 by selecting the lock function menu 1120.

In operation S1004, the mobile device 3000 according to an embodiment of the present disclosure may receive a user input of releasing locking of the cleaning robot.

Referring to 1100*b* of FIG. 11, the mobile device 3000 may receive the user input of selecting the lock function menu 1120, and thus, may display a lock function setting GUI 1130 on the display. When the user set the cleaning robot 1000 to the lock state, it may be displayed that a particular lock menu of an unconditional lock setting menu 1140 or a conditional lock setting menu 1150 which is displayed in the lock function setting GUI 1130 is selected. For example, when the user sets the cleaning robot 1000 to an unconditional lock state, it may be displayed that a cleaning robot lock menu 1160 is selected from the unconditional lock setting menu 1140. Also, for example, there may be a case in which the user sets the cleaning robot 1000 to a conditional lock state. In this case, it may be displayed that each menu (a particular account lock menu 1170, a particular state lock menu 1180, a particular time lock menu 1190) is selected from the conditional lock setting menu 1150 displayed on the display of the mobile device 3000.

According to an embodiment of the present disclosure, the user may release lock selection displayed on the lock function setting GUI 1130, thereby releasing the lock state of the cleaning robot 1000. For example, when it is displayed that the cleaning robot lock menu 1160 is selected from the unconditional lock setting menu 1140, the user may release the unconditional lock state of the cleaning robot 1000 by releasing selection of the cleaning robot lock menu 1160. Referring to 1100*c* of FIG. 11, when the user releases selection of the cleaning robot lock menu 1160 from the unconditional lock setting menu 1140, the mobile device 3000 may display, on the display, that selection of the cleaning robot lock menu 1160 is released.

In operation S1005, the mobile device 3000 according to an embodiment of the present disclosure may deliver a lock release request to the server device 2000. The lock release request according to an embodiment of the present disclosure may include an unconditional lock release request and a conditional lock release request.

When the mobile device 3000 according to an embodiment of the present disclosure receives the user input of releasing selection of the cleaning robot lock menu 1160 from the unconditional lock setting menu 1140, the mobile device 3000 may deliver, to the server device 2000, an unconditional lock release request for immediately releasing the lock state of the cleaning robot 1000.

The mobile device 3000 according to an embodiment of the present disclosure may receive a user input of releasing selection of each menu (the particular account lock menu 1170, the particular state lock menu 1180, and the particular time lock menu 1190) of the conditional lock setting menu 1150. In this case, the mobile device 3000 may deliver, to the server device 2000, a conditional lock release request for releasing the lock state of the cleaning robot 1000 under a particular condition.

In operation S1006, the server device 2000 according to an embodiment of the present disclosure may deliver the received lock release request to the cleaning robot 1000. The lock release request according to an embodiment of the present disclosure may include the unconditional lock release request and the conditional lock release request.

In operation S1007, the cleaning robot 1000 according to an embodiment of the present disclosure may release the lock state of the cleaning robot 1000, based on the lock release request.

The cleaning robot 1000 according to an embodiment of the present disclosure may activate an operation button mounted at the main body of the cleaning robot 1000 or may activate a voice recognition function of the cleaning robot 1000, thereby releasing the lock state of the cleaning robot 1000. Referring to **1100*d* of FIG. 11, when the lock state of the cleaning robot 1000 is released, the cleaning robot 1000 may display, via a voice of the LED display, that the lock state of the cleaning robot 1000 is released. For example, the cleaning robot 1000 may guide the user that the lock state of the cleaning robot 1000** is released, via a voice ("A lock function is released.").

Figure 12A:
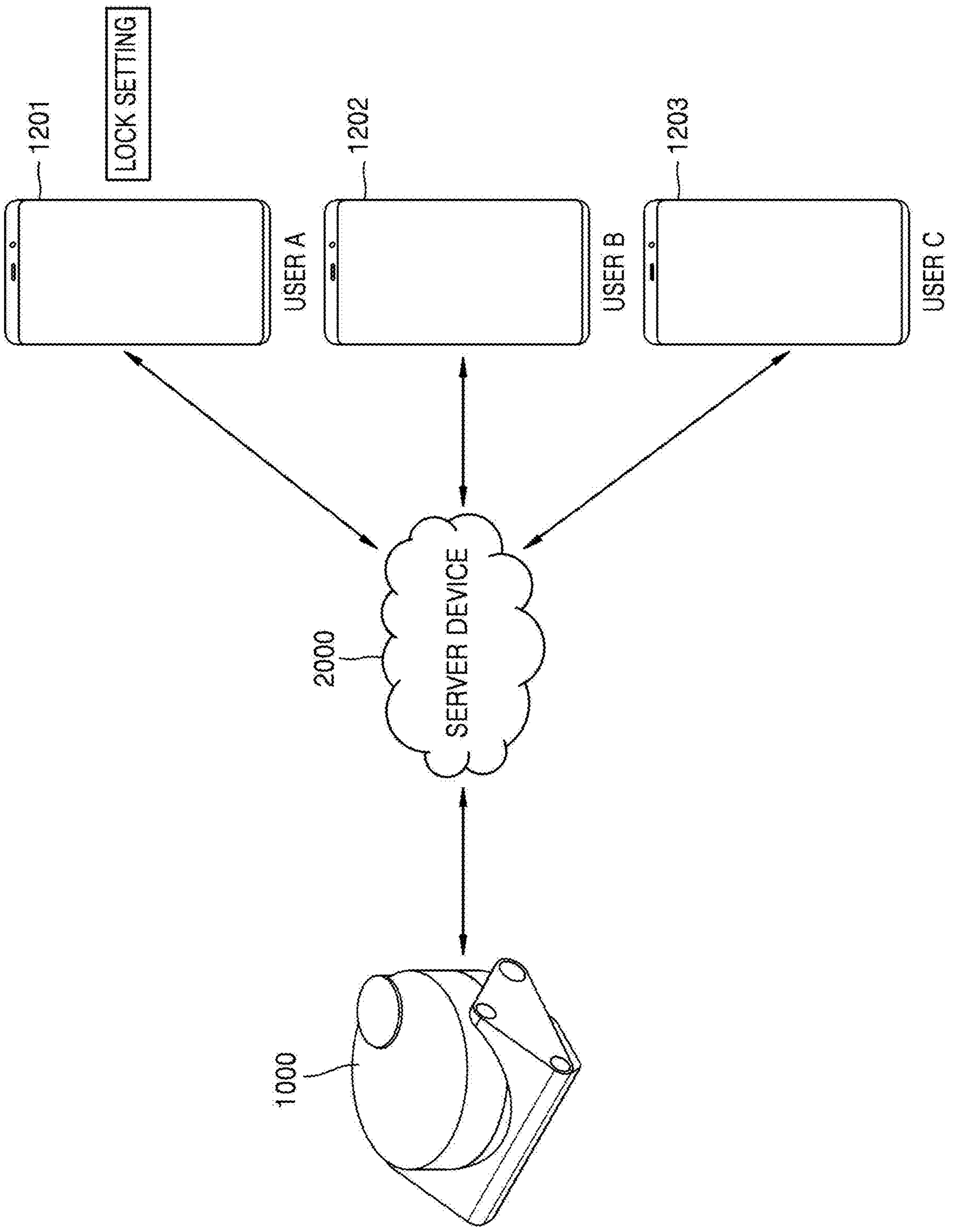
FIGS. 12A, 12B to 12C are diagrams for describing a method of releasing a lock state of a cleaning robot when the cleaning robot is registered in a plurality of user accounts, according to an embodiment of the present disclosure.
Figure 12B:
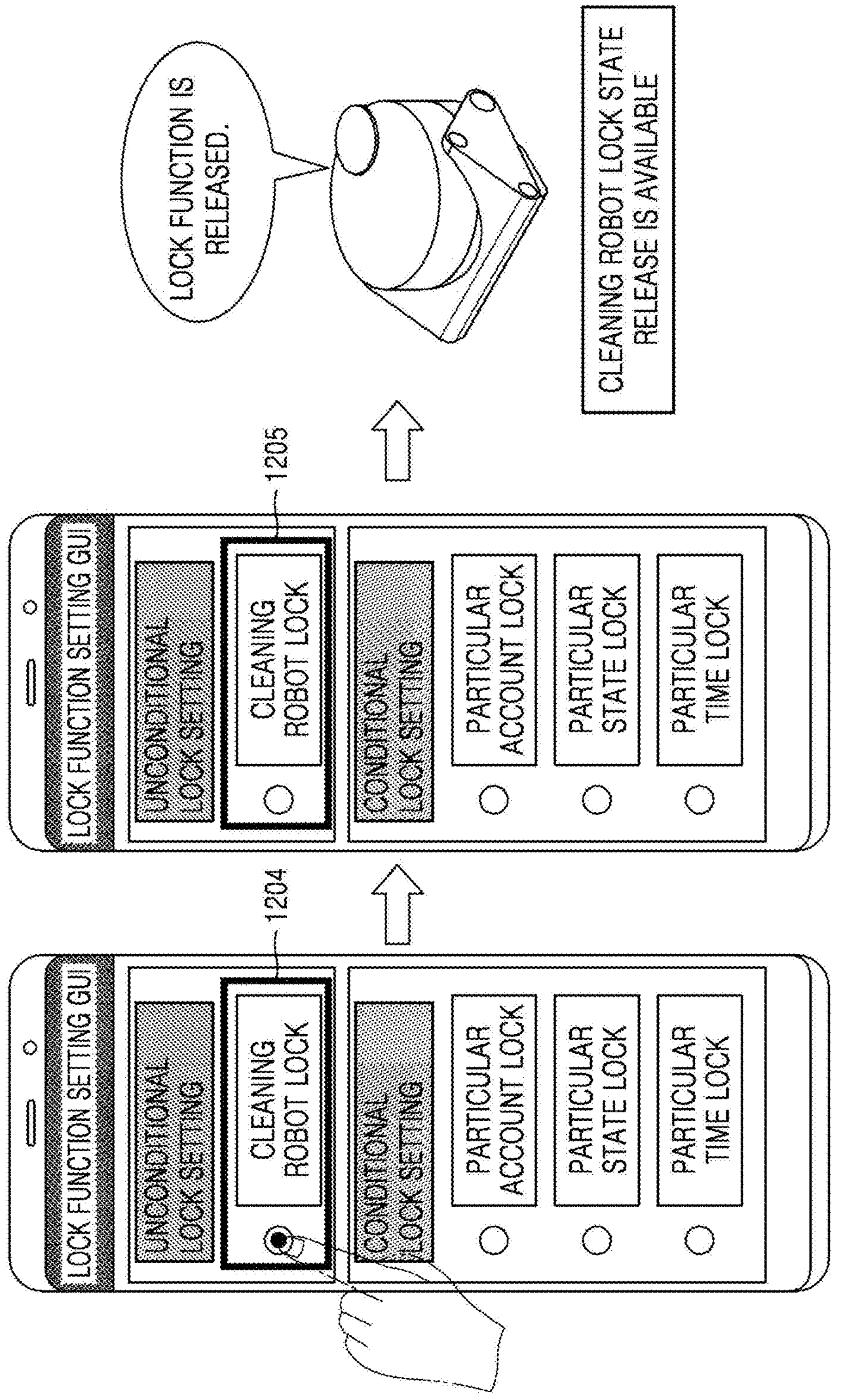
Figure 12C:
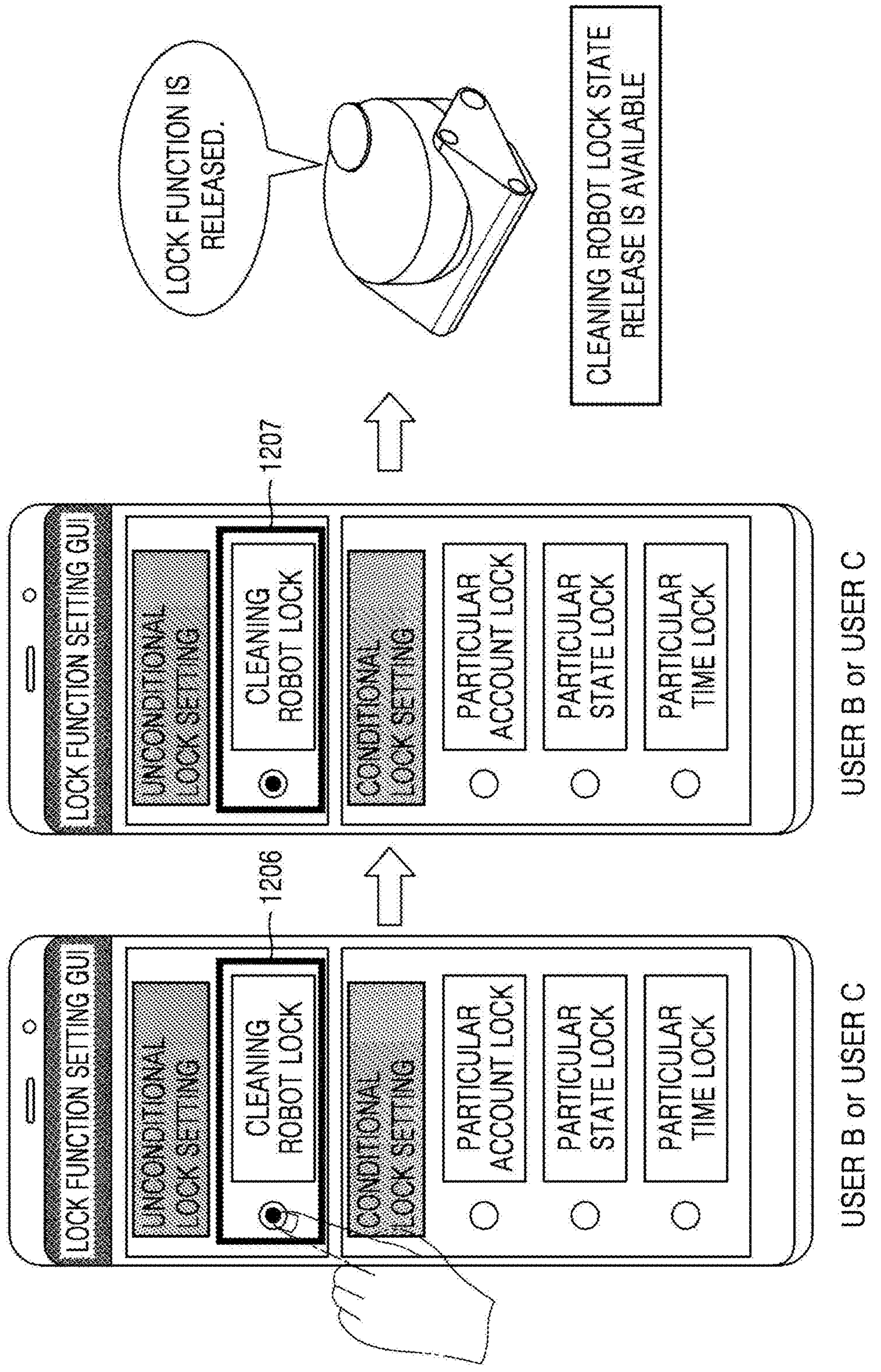

FIGS. 12 to 12C are diagrams for describing a method of releasing a lock state of a cleaning robot when the cleaning robot is registered in a plurality of user accounts, according to an embodiment of the present disclosure.

Referring to FIG. 12A, the cleaning robot 1000 according to an embodiment of the present disclosure may be simultaneously registered in an account of user A 1201, an account of user B 1202, and an account of user C 1203. The cleaning robot 1000 according to an embodiment of the present disclosure may be simultaneously registered in each of accounts of users who share a living space. Accordingly, the accounts of user A 1201, user B 1202, and user C 1203 may be user accounts corresponding to family members, but the present disclosure is not limited thereto.

When the cleaning robot 1000 according to an embodiment of the present disclosure is registered in the account of user A 1201, the account of user B 1202, and the account of user C 1203, user A 1201, user B 1202, and user C 1203 may separately control an operation of the cleaning robot 1000. Here, when user A 1201 sets the cleaning robot 1000 to a lock state, the cleaning robot 1000 may be validly set to the lock state. Here, user A 1201 may desire that only user A 1201 can validly release the lock state of the cleaning robot 1000. In a case where user B 1202 or user C 1203 can release the lock state of the cleaning robot 1000 even when user A 1201 set the cleaning robot 1000 to the lock state, a preset purpose for which user A 1201 set the cleaning robot 1000 to the lock state may not be accomplished.

According to an embodiment of the present disclosure, when the cleaning robot 1000 is registered in a plurality of accounts, a lock state of the cleaning robot 1000 may be validly released only when a user account that made a lock setting request requests a lock release request. When the cleaning robot 1000 according to an embodiment of the present disclosure is registered in the account of user A 1201, the account of user B 1202, and the account of user C 1203, and user A 1201 set the cleaning robot 1000 to the lock state, only user A 1201 can validly release the lock state of the cleaning robot 1000.

The cleaning robot 1000 according to an embodiment of the present disclosure may compare an identification value of a lock setting request with an identification value of a lock release request, and may release the lock state of the cleaning robot 1000 only when the identification value of the lock setting request matches with the identification value of the lock release request. The identification value of the lock setting request according to an embodiment of the present disclosure may include information (e.g., user account ID) about a user account that delivered the lock setting request. The identification value of the lock release request according to an embodiment of the present disclosure may include information (e.g., user account ID) about a user account that delivered the lock release request. Accordingly, only when a user account that set the cleaning robot 1000 to the lock state delivers the lock release request, the cleaning robot 1000 may validly release the lock state of the cleaning robot 1000.

Referring to FIG. 12B, user A 1201 may release the lock state of the cleaning robot 1000 by releasing lock selection displayed in the lock function setting GUI. In this regard, user A 1201 may be a user who set the cleaning robot 1000 to the lock state. For example, when user A 1201 set the cleaning robot 1000 to an unconditional lock state, it may be a state 1204 in which a cleaning robot lock menu is selected from an unconditional lock setting menu. Here, user A 1201 may release selection of the cleaning robot lock menu, and in this case, the mobile device 3000 may display, on the display, a state 1205 in which the cleaning robot lock menu is released.

According to an embodiment of the present disclosure, when user A 1201 releases lock selection displayed on the lock function setting GUI, the cleaning robot 1000 may validly release the lock state of the cleaning robot 1000. According to an embodiment of the present disclosure, when the lock state of the cleaning robot 1000 is validly released, the cleaning robot 1000 may display, via a voice or the LED display, that the lock state of the cleaning robot 1000 is released. For example, the cleaning robot 1000 may guide a user that the lock state of the cleaning robot 1000 is released, via a voice ("Lock function is released.").

Referring to FIG. 12C, it may be impossible for user B 1202 or user C 1203 to release the lock state of the cleaning robot 1000. Here, user A 1201 may be the user who set the cleaning robot 1000 to the lock state, and user B 1202 or user C 1203 may not be the user who set the cleaning robot 1000 to the lock state. For example, when user A 1201 set the cleaning robot 1000 to the unconditional lock state, it may be a state 1206 in which a cleaning robot lock menu is selected from an unconditional lock setting menu. Here, even when user B 1202 or user C 1203 performs an input of releasing selection of the cleaning robot lock menu, the mobile device 3000 may display, on the display, a state 1207 in which the cleaning robot lock menu is selected. Also, even when user B 1202 or user C 1203 performs the input of releasing selection of the cleaning robot lock menu, the lock state of the cleaning robot 1000 may not be validly released. In this case, the cleaning robot 1000 may guide a user that the lock state of the cleaning robot 1000 cannot be released, via a voice ("Lock function cannot be released.").

Figure 13:
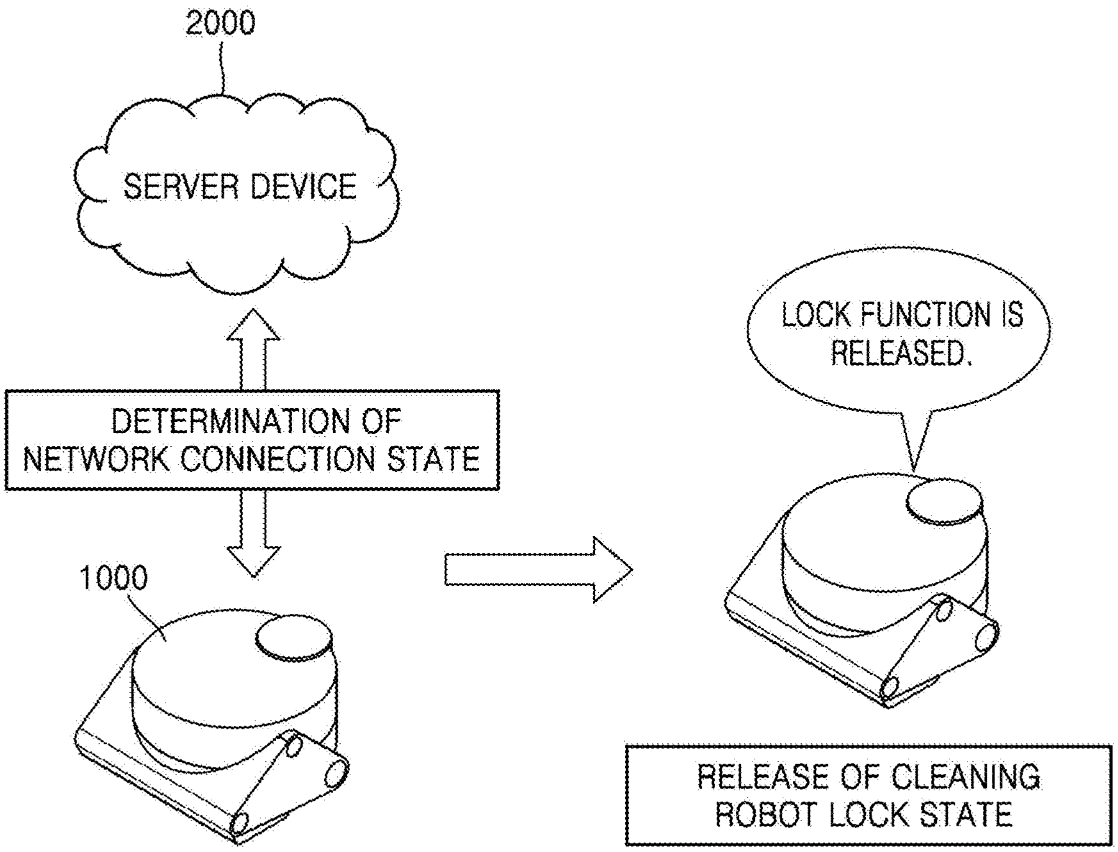
FIG. 13 is a diagram for describing a method by which a cleaning robot releases a lock state of the cleaning robot, based on a network connection state between the cleaning robot and a server device, according to an embodiment of the present disclosure.

FIG. 13 is a diagram for describing a method by which a cleaning robot releases a lock state of the cleaning robot, based on a network connection state between the cleaning robot and a server device, according to an embodiment of the present disclosure.

The cleaning robot 1000 according to an embodiment of the present disclosure may release a lock state of the cleaning robot 1000, based on a network state between the cleaning robot 1000 and the server device 2000. The cleaning robot 1000 according to an embodiment of the present disclosure may be measuring a network connection state between the cleaning robot 1000 and the server device 2000.

While the cleaning robot 1000 is set to the lock state, when the network state between the cleaning robot 1000 and the server device 2000 is unstable, the cleaning robot 1000 may not receive a lock release request from the mobile device 3000. In this case, the lock state of the cleaning robot 1000 may be continuously maintained, unlike a user's intention. Therefore, provided is an embodiment in which, when the network connection state between the cleaning robot 1000 and the server device 2000 is unstable, the cleaning robot 1000 can automatically release the lock state of the cleaning robot 1000.

According to an embodiment of the present disclosure, the cleaning robot 1000 may continuously measure the network connection state between the cleaning robot 1000 and the server device 2000, and when it is determined that a network speed or a network signal strength is maintained at a threshold value or less for a threshold time, the cleaning robot 1000 may automatically release the lock state of the cleaning robot 1000.

Figure 14:
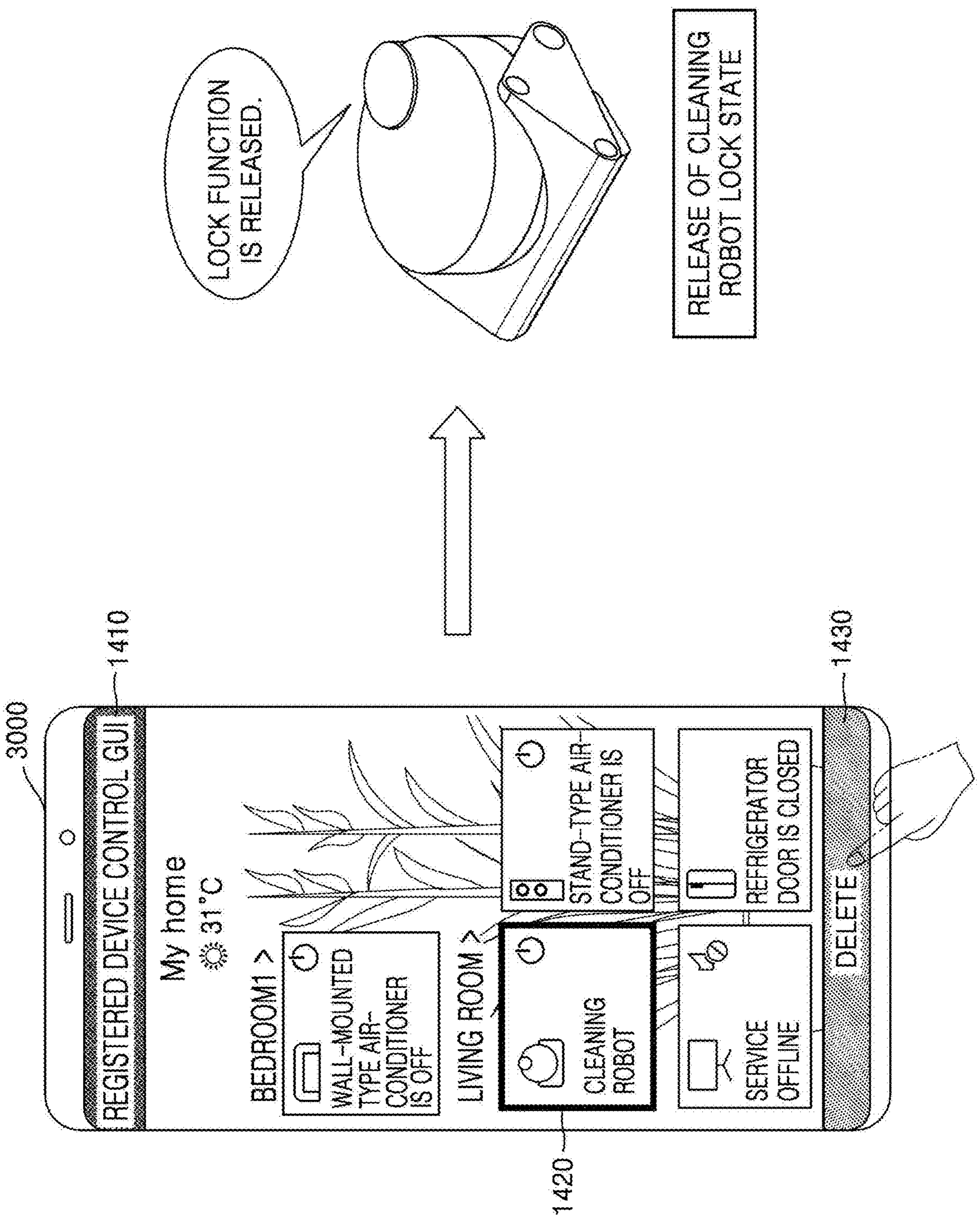
FIG. 14 is a diagram for describing a method of releasing a lock state of a cleaning robot 1000 when the cleaning robot 1000 is deleted from an account to which the cleaning robot is registered, according to an embodiment of the present disclosure.

FIG. 14 is a diagram for describing a method of releasing a lock state of the cleaning robot 1000 when the cleaning robot 1000 is deleted from an account to which the cleaning robot is registered, according to an embodiment of the present disclosure.

According to an embodiment of the present disclosure, when the cleaning robot 1000 is deleted from a preset account of the server device 2000 to which the cleaning robot 1000 is registered, the lock state of the cleaning robot 1000 may be automatically released.

According to an embodiment of the present disclosure, a registered device control GUI 1410 may be displayed on the display of the mobile device 3000, and a user may control registered home appliances via the registered device control GUI 1410. In this regard, the user may delete the registered home appliances from the account of the server device 2000 via the registered device control GUI 1410. According to an embodiment of the present disclosure, the user may delete the cleaning robot 1000 from the account of the server device 2000 by selecting a cleaning robot menu 1420 and selecting a delete menu 1430 from the registered device control GUI 1410.

According to an embodiment of the present disclosure, when the mobile device 3000 receives a user input of deleting the cleaning robot 1000 from the user, the mobile device 3000 may deliver, to the server device 2000, a signal (hereinafter, the cleaning robot 1000 deletion signal) including information indicating that the cleaning robot 1000 is deleted from the account of the server device 2000. The server device 2000 according to an embodiment of the present disclosure may deliver the received cleaning robot 1000 deletion signal to the cleaning robot 1000. According to an embodiment of the present disclosure, when the cleaning robot 1000 receives the cleaning robot 1000 deletion signal, the cleaning robot 1000 may release a lock state of the cleaning robot 1000, in response to reception of the signal. According to an embodiment of the present disclosure, when the lock state of the cleaning robot 1000 is efficiently released, the cleaning robot 1000 may display that the lock state of the cleaning robot 1000 is released, via a voice or the LED display. For example, the cleaning robot 1000 may guide the user that the lock state of the cleaning robot 1000 is released, via a voice ("Lock function is released.").

According to an embodiment of the present disclosure, when the cleaning robot 1000 is registered in a plurality of accounts, the lock state of the cleaning robot 1000 may be validly released only when a user account who made a lock setting request deletes the cleaning robot 1000 from the account. For example, when the cleaning robot 1000 is registered in an account of user A and an account of user B, and user A sets the cleaning robot 1000 to a lock state, only when user A deletes the cleaning robot 1000 from the account of user A, the lock state of the cleaning robot 1000 may be automatically released. Therefore, in a case where user A sets the cleaning robot 1000 to the lock state and user B deletes the cleaning robot 1000 from the account of user B, the lock state of the cleaning robot 1000 may not be released and may be maintained.

The cleaning robot 1000 according to an embodiment of the present disclosure may compare an identification value of a lock setting request with an identification value of the cleaning robot 1000 deletion signal, and may release the lock state of the cleaning robot 1000 only when the identification value of the lock setting request matches with the identification value of the cleaning robot 1000 deletion signal. The identification value of the lock setting request according to an embodiment of the present disclosure may include information (e.g., user account ID) about a user account that delivered the lock setting request. The identification value of the cleaning robot 1000 deletion signal according to an embodiment of the present disclosure may include information (e.g., user account ID) about a user account that deleted the cleaning robot 1000. Accordingly, the cleaning robot 1000 may validly release a lock state of the cleaning robot 1000 only when a user account who set the cleaning robot 1000 to the lock state deletes the cleaning robot 1000 from the account.

Figure 15:
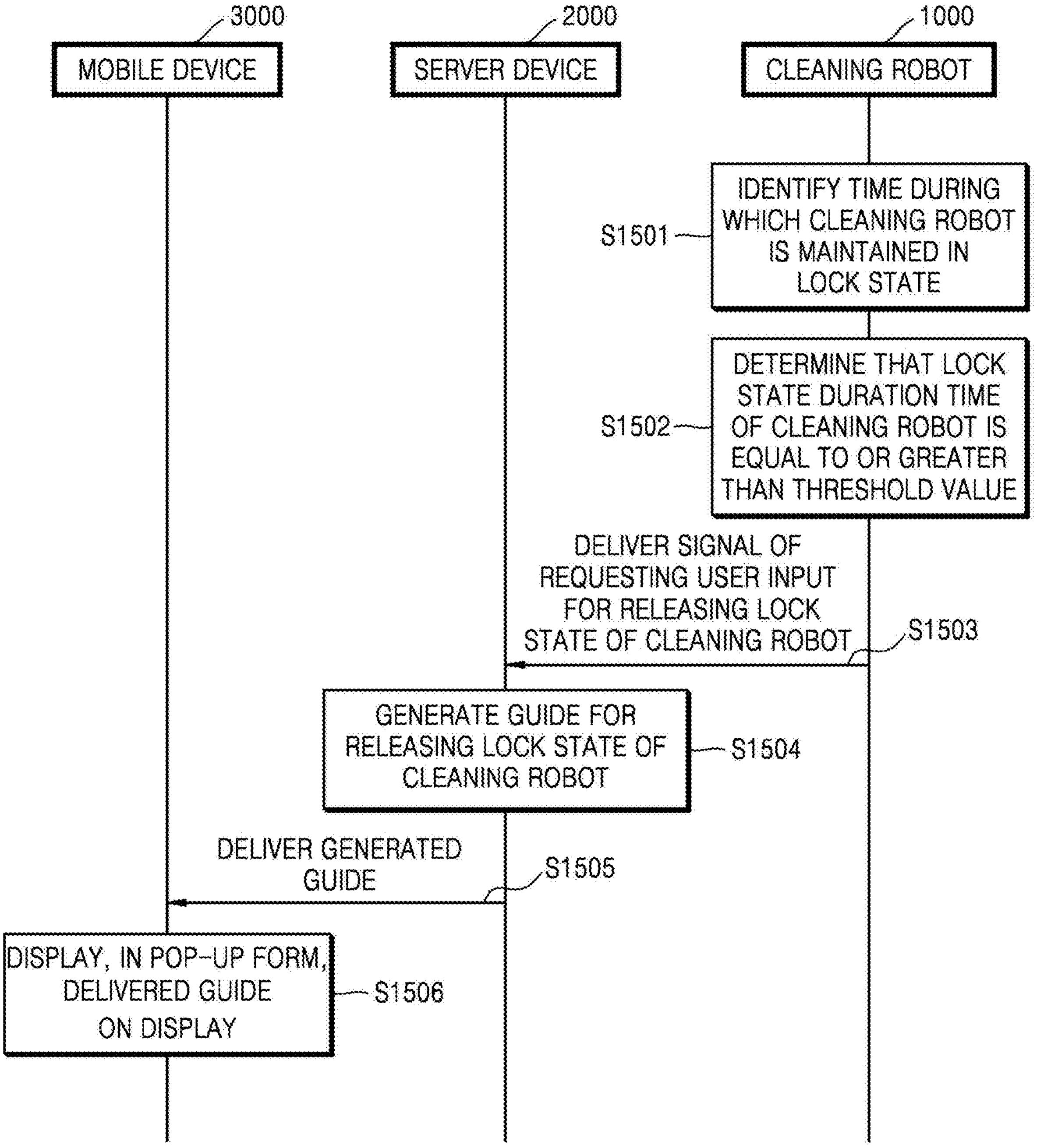
FIG. 15 is a flowchart for describing a method of recommending a release of a lock state when the lock state of a cleaning robot is maintained for a threshold time or more, according to an embodiment of the present disclosure.

FIG. 15 is a flowchart for describing a method of recommending a release of a lock state when the lock state of a cleaning robot is maintained for a threshold time or more, according to an embodiment of the present disclosure.

According to an embodiment of the present disclosure, when the lock state of the cleaning robot 1000 is maintained for a long time, the cleaning robot 1000 may determine that a user forgot that the cleaning robot 1000 is set to the lock state. In this case, the cleaning robot 1000 may deliver a guide of recommending the user to release the lock state of the cleaning robot 1000.

In operation S1501, the cleaning robot 1000 according to an embodiment of the present disclosure may identify a time during which the cleaning robot 1000 is maintained in the lock state.

The cleaning robot 1000 according to an embodiment of the present disclosure may store information related to a time at which the cleaning robot 1000 is set to the lock state. The cleaning robot 1000 according to an embodiment of the present disclosure may identify a time period from a time at which the cleaning robot 1000 is set to the lock state to a current time (hereinafter, the lock state duration time).

In operation S1502, the cleaning robot 1000 according to an embodiment of the present disclosure may determine that the lock state duration time of the cleaning robot 1000 is equal to or greater than a threshold value.

The cleaning robot 1000 according to an embodiment of the present disclosure may have set a lock state maximum duration time of the cleaning robot 1000 to the threshold value. For example, the cleaning robot 1000 may have set the lock state maximum duration time to 30 minutes, but the present disclosure is not limited thereto. The cleaning robot 1000 according to an embodiment of the present disclosure may determine that the lock state duration time of the cleaning robot 1000 is equal to or greater than the threshold value.

In operation S1503, the cleaning robot 1000 according to an embodiment of the present disclosure may deliver, to the server device 2000, a signal of requesting a user input for releasing the lock state of the cleaning robot 1000.

In operation S1504, the server device 2000 according to an embodiment of the present disclosure may generate a guide for releasing the lock state of the cleaning robot 1000.

The guide for releasing the lock state of the cleaning robot 1000 (hereinafter, the guide) according to an embodiment of the present disclosure may include a text indicating that the lock state duration time of the cleaning robot 1000 is equal to or greater than the threshold value, and a method for a user to release the lock state of the cleaning robot 1000. For example, the guide may include a text "A lock state of a cleaning robot is maintained over 30 minutes. Please release the lock state by using a method below." The guide according to an embodiment of the present disclosure may include a method of releasing the lock state of the cleaning robot 1000 by inputting a reset button mounted at the cleaning robot 1000. The guide according to an embodiment of the present disclosure may include a method of releasing the lock state of the cleaning robot 1000 via the mobile device 3000.

In operation S1505, the server device 2000 according to an embodiment of the present disclosure may deliver the generated guide to the mobile device 3000, and in operation S1506, the mobile device 3000 according to an embodiment of the present disclosure may display, in a pop-up form, the delivered guide on the display of the cleaning robot 1000.

According to an embodiment of the present disclosure, when the mobile device 3000 receives the guide from the server device 2000, the mobile device 3000 may display, in the pop-up form, the received guide on a current screen of the mobile device 3000. By doing so, the user may recognize that the lock state of the cleaning robot 1000 is maintained for a long time, and may immediately release the lock state of the cleaning robot 1000.

Figure 16:
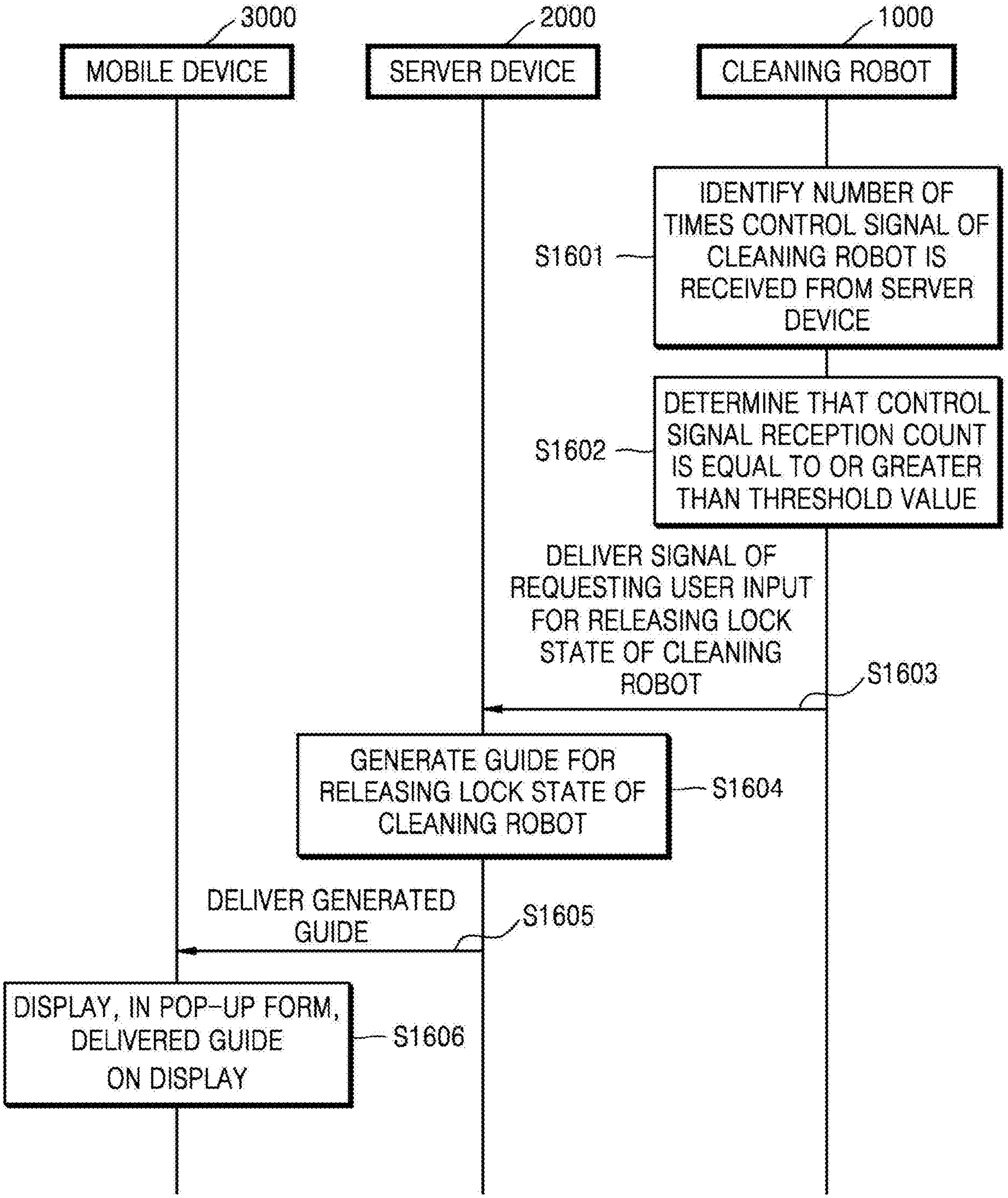
FIG. 16 is a flowchart for describing a method by which, when a cleaning robot in a lock state identifies a direct control attempt, the cleaning robot recommends to release the lock state, according to an embodiment of the present disclosure.

FIG. 16 is a flowchart for describing a method by which, when a cleaning robot in a lock state identifies a direct control attempt, the cleaning robot recommends to release the lock state, according to an embodiment of the present disclosure.

While the cleaning robot 1000 is in the lock state, a user may continuously attempt to remotely control the cleaning robot 1000 via the mobile device 3000. In this case, the cleaning robot 1000 may determine that the user forgot that the cleaning robot 1000 is set to the lock state, and may deliver a guide of recommending the user to release the lock state of the cleaning robot 1000.

In operation S1601, the cleaning robot 1000 according to an embodiment of the present disclosure may identify the number of times a control signal of the cleaning robot 1000 is received from the server device 2000.

According to an embodiment of the present disclosure, the user may log in a preset account of the server device 2000 by using the mobile device 3000 and may remotely control an operation of the cleaning robot 1000 registered in the preset account. When the mobile device 3000 receives a user input for controlling the cleaning robot 1000 from the user, the mobile device 3000 may deliver the control signal of the cleaning robot 1000 to the server device 2000. The server device 2000 according to an embodiment of the present disclosure may deliver the received control signal to the cleaning robot 1000. The cleaning robot 1000 may perform a particular operation, in response to the received control signal.

When the cleaning robot 1000 according to an embodiment of the present disclosure receives the control signal from the server device 2000 after the cleaning robot 1000 is set to the lock state, the cleaning robot 1000 may identify the number of times a control signal is received from the server device 2000 (hereinafter, the control signal reception count).

In operation S1602, when the cleaning robot 1000 according to an embodiment of the present disclosure may determine that the control signal reception count is equal to or greater than a threshold value.

The cleaning robot 1000 according to an embodiment of the present disclosure may set, as the threshold value, a maximum reception count of a control signal in a lock state of the cleaning robot 1000. For example, the cleaning robot 1000 may set the maximum reception count of a control signal to 5, but the present disclosure is not limited thereto. The cleaning robot 1000 according to an embodiment of the present disclosure may determine that the control signal reception count is equal to or greater than the threshold value.

In operation S1603, the cleaning robot 1000 according to an embodiment of the present disclosure may deliver, to the server device 2000, a signal of requesting a user input for releasing the lock state of the cleaning robot 1000.

In operation S1604, the server device 2000 according to an embodiment of the present disclosure may generate a guide for releasing the lock state of the cleaning robot 1000.

The guide for releasing the lock state of the cleaning robot 1000 (hereinafter, the guide) according to an embodiment of the present disclosure may include a text indicating that the cleaning robot 1000 in the lock state has received a control signal, and a method for a user to release the lock state of the cleaning robot 1000. For example, the guide may include a text "A control signal is received over 5 times in a lock state of a cleaning robot. Please release the lock state by using a method below." The guide according to an embodiment of the present disclosure may include a method of releasing the lock state of the cleaning robot 1000 by inputting a reset button mounted at the cleaning robot 1000. The guide according to an embodiment of the present disclosure may include a method of releasing the lock state of the cleaning robot 1000 via the mobile device 3000.

In operation S1605, the server device 2000 according to an embodiment of the present disclosure may deliver the generated guide to the mobile device 3000, and in operation S1606, the mobile device 3000 according to an embodiment of the present disclosure may display, in a pop-up form, the delivered guide on the display of the cleaning robot 1000.

According to an embodiment of the present disclosure, when the mobile device 3000 receives the guide from the server device 2000, the mobile device 3000 may display, in the pop-up form, the received guide on a current screen of the mobile device 3000. By doing so, the user who attempted to control the cleaning robot 1000 via the mobile device 3000 may recognize that the cleaning robot 1000 is currently in the lock state, and may immediately release the lock state of the cleaning robot 1000.

Figure 17:
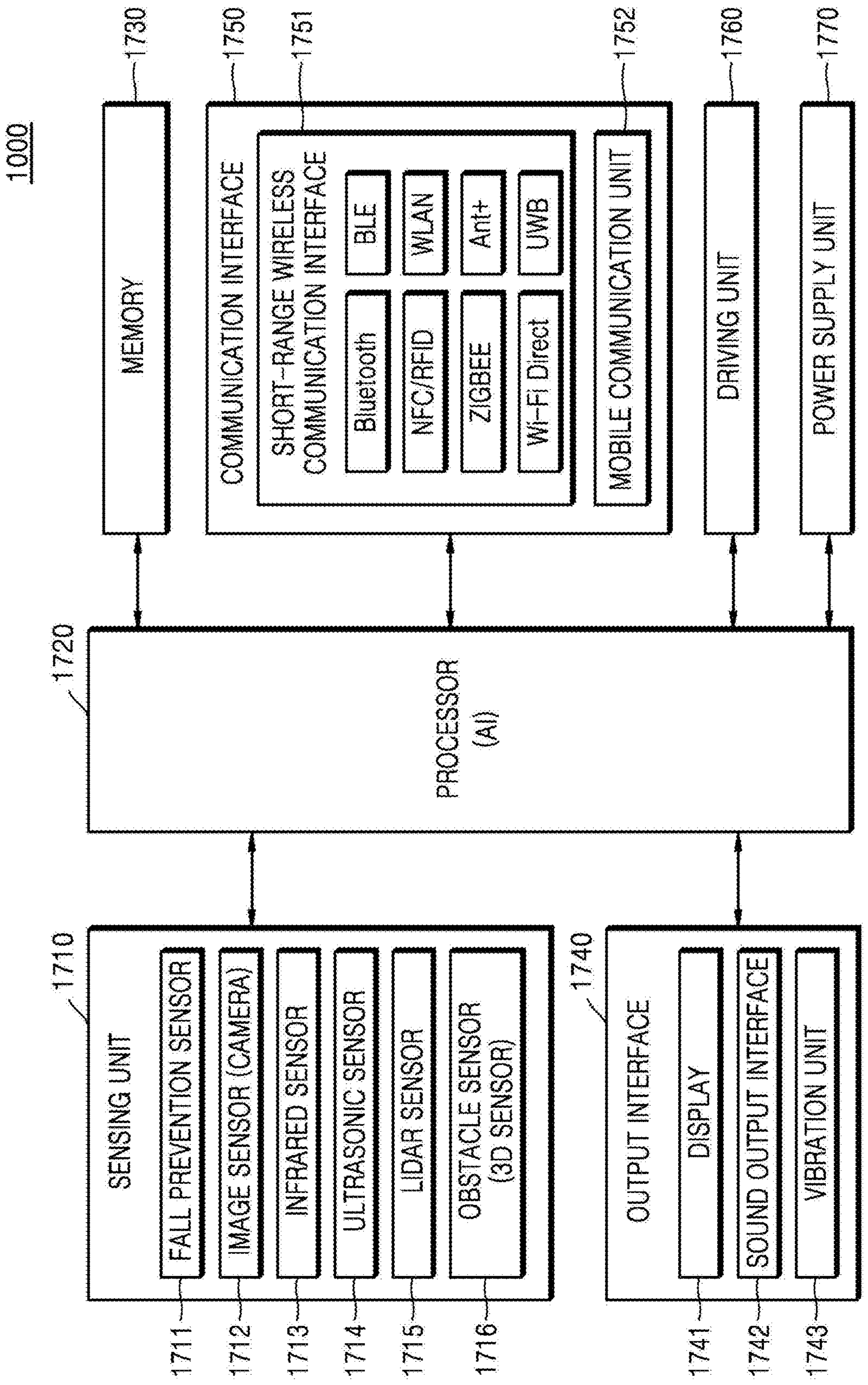
FIG. 17 is a block diagram for describing a function of a cleaning robot according to an embodiment of the present disclosure.

FIG. 17 is a block diagram for describing a function of a cleaning robot according to an embodiment of the present disclosure.

Referring to FIG. 17, the cleaning robot 1000 may include a sensing unit 1710, a processor 1720, a memory 1730, an output interface 1740, a communication interface 1750, a driving unit 1760, and a power supply unit 1770. However, not all elements shown in FIG. 17 are necessary elements of the cleaning robot 1000. The cleaning robot 1000 may be implemented with more elements than the elements shown in FIG. 17, or fewer elements than the elements shown in FIG. 17. The respective elements will be described below.

The sensing unit 1710 may include a plurality of sensors configured to detect information about an environment around the cleaning robot 1000. For example, the sensing unit 1710 may include a fall prevention sensor 1711, an image sensor (e.g., a camera) 1712 (for example, a stereo camera, a mono camera, a wide-angle camera, an aroundview camera, a three-dimensional (3D) vision sensor, etc.), an infrared sensor 1713, an ultrasonic sensor 1714, a LIDAR sensor 1715, an obstacle sensor (e.g., a 3D sensor) 1716, a mileage sensor (not shown), or the like, but the present disclosure is not limited thereto. The mileage sensor may include a rotation detection sensor configured to calculate a rotation speed of a wheel. For example, the rotation detection sensor may be an encoder installed to detect a rotation speed of a motor. A plurality of image sensors (e.g., cameras) 1712 may be arranged in the cleaning robot 1000. Because the functions of the respective sensors may be intuitively inferred from their names, detailed descriptions thereof are omitted.

The processor 1720 may generally control all operations of the cleaning robot 1000. The processor 1720 may control the sensing unit 1710, the output interface 1740, the communication interface 1750, the driving unit 1760, and the power supply unit 1770 by executing stored programs.

According to an embodiment of the present disclosure, the processor 1720 may include an artificial intelligence (AI) processor. In this case, the AI processor may divide at least one cleanable area into a plurality of partial areas according to a cleaning mode by using a learning network model of an AI system. The AI processor may also plan a cleaning route according to a cleaning mode.

The AI processor may be manufactured in the form of a dedicated hardware chip for AI, or may be manufactured as part of an existing general-purpose processor (e.g., a CPU or an application processor) or a dedicated graphics processor (e.g., a GPU) and mounted on the cleaning robot 1000.

The processor 1720 may be responsible for cleaning driving such as determining the moving direction of the cleaning robot 1000, position recognition, and automatic charging of a battery. For example, the processor 1720 may perform control such that the battery waits in a state of being connected to an external charging device when the battery is not in operation, so as to maintain a battery level within a preset range. When a charge request and a signal are input from a battery level detection unit at the time of operation completion or during operation, the processor 1720 may control the driving unit 1760 to return to the external charging device (charging station).

The memory 1730 may store programs for processing and control by the processor 1720 and may store a plurality of pieces of input/output data. The memory 1730 may also store an AI model.

The memory 1730 may include at least one type of storage medium from among flash memory, a hard disk, a multimedia card micro, a memory card (e.g., a SD or XD memory card), a RAM, a SRAM, a ROM, an EEPROM, a PROM, a magnetic memory, a magnetic disk, and an optical disc. Also, the cleaning robot 1000 may run a web storage or a cloud server which performs a storage function on the Internet.

The output interface 1740 is for outputting an audio signal, a video signal, or a vibration signal, and may include a display 1741, a sound output interface 1742, and a vibration unit 1743.

The display 1741 may output and display information that is processed in the cleaning robot 1000. For example, the display 1741 may display a current position of the cleaning robot 1000, may display a cleaning mode of the cleaning robot 1000, or may display a cleaning state (e.g., a progress rate), a charging state (e.g., a remaining battery level), whether the cleaning robot 1000 is currently in a lock state, or the like, but the present disclosure is not limited thereto. The display 1741 may also display a user interface (UI) or a graphical UI (GUI) related to a mode setting.

When the display 1741 and a touch pad form a layer structure to constitute a touch screen, the display 1741 may be used as both an output device and an input device. The display 1741 may include at least one of a liquid crystal display, a thin film transistor-liquid crystal display, an organic light-emitting diode display, a flexible display, a 3D display, or an electrophoretic display. According to a type of the cleaning robot 1000, the cleaning robot 1000 may include at least two displays 1741.

The sound output interface 1742 may output audio data received from the communication interface 1750 or stored in the memory 1730. In addition, the sound output interface 1742 may output a sound signal related to a function performed by the cleaning robot 1000. For example, the sound output interface 1742 may output a voice indicating that the cleaning robot 1000 is set to a lock state. The sound output interface 1742 may include a speaker, a buzzer, or the like.

The vibration unit 1743 may output a vibration signal. For example, the vibration unit 1743 may output a vibration signal corresponding to output of audio data or video data (e.g., a warning message, etc.).

The communication interface 1750 may include at least one antenna for wirelessly communicating with other device (e.g., the server device 2000, the mobile device 3000). For example, the communication interface 1750 may include one or more elements configured to enable communication between the cleaning robot 1000 and the server device 2000 or between the cleaning robot 1000 and the mobile device 3000. For example, the communication interface 1750 may include a short-range wireless communication interface 1751, a mobile communication unit 1752, or the like, but the present disclosure is not limited thereto.

The short-range wireless communication interface 1751 may include a Bluetooth communication interface, a BLE communication interface, a NFC, a WLAN (Wi-Fi) communication interface, a ZigBee communication interface, an IrDA communication interface, a WFD communication interface, an UWB communication interface, an Ant+ communication interface, a microwave (uWave) communication interface, or the like, but the present disclosure is not limited thereto.

The mobile communication unit 1752 may transmit or receive a wireless signal with at least one of a base station, an external terminal, or a server, over a mobile communication network. Here, the wireless signal may include a voice call signal, a video call signal, or various types of data according to text/multimedia message transmission and reception.

According to an embodiment, the communication interface 1750 of the cleaning robot 1000 may receive a control command from the server device 2000 or the mobile device 3000. The communication interface 1750 of the cleaning robot 1000 may also transmit a cleaning operation execution result to the mobile device 3000. For example, the cleaning operation execution result may include information such as 'Cleaning completed', 'Cleaning stopped, 'Cleaning partially completed', etc., but the present disclosure is not limited thereto.

The driving unit 1760 may include elements used for driving (operating) of the cleaning robot 1000 and operations of devices inside the cleaning robot 1000. The driving unit 1760 may include a suction unit, a driving unit, or the like, but the present disclosure is not limited thereto. The suction unit may function to collect dust on the floor while suctioning air, and may include a rotation brush or broom, a rotation brush motor, an air suction port, a filter, a dust collecting chamber, an air discharge port, or the like, but the present disclosure is not limited thereto. The suction unit may additionally be mounted in a structure in which a brush capable of sweeping out dust from a corner is rotatable.

The driving unit may include two front wheels on both sides of the front, two rear wheels on both sides of the rear, motors respectively configured to rotate and drive the two rear wheels, timing belts configured to deliver powers generated from the two rear wheels to the two front wheels, or the like, but the present disclosure is not limited thereto.

According to an embodiment, the cleaning robot 1000 may include an input unit (not shown). The input unit refers to a means via which a user inputs data for controlling the cleaning robot 1000. For example, the input unit may be at least one of a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, but the present disclosure is not limited thereto.

Figure 18:
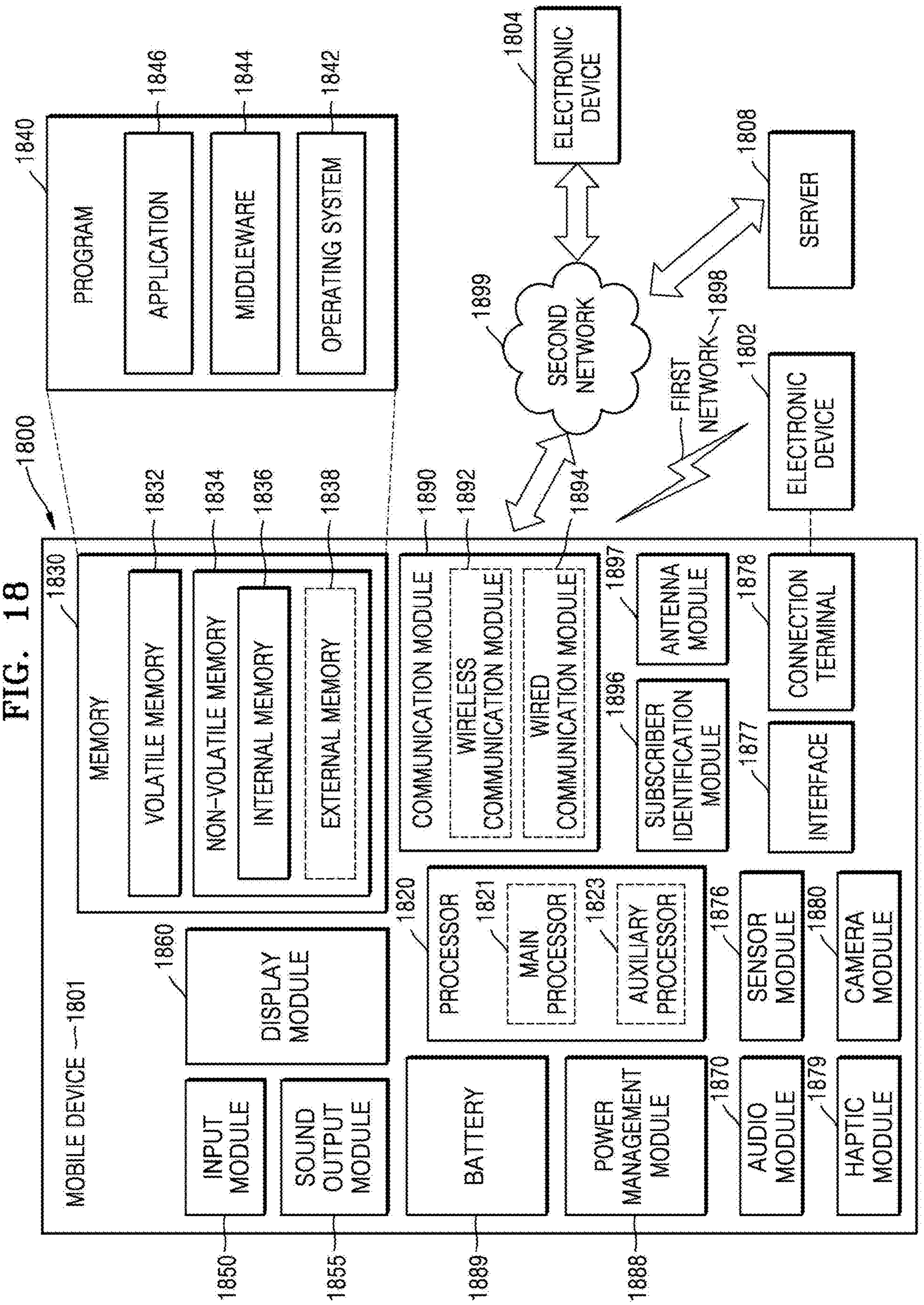
FIG. 18 is a block diagram of a mobile device in a network environment, according to various embodiments of the present disclosure.

FIG. 18 is a block diagram of a mobile device 1801 in a network environment 1800, according to various embodiments of the present disclosure.

The mobile device 1801 of FIG. 18 may correspond to the mobile device 300 described above. Also, the processor 210 described with reference to FIG. 2 may correspond to a processor 1820, and the communication interface 212 described with reference to FIG. 2 may correspond to a communication nodule 1890. Also, the memory 214 described with reference to FIG. 2 may correspond to a memory 1830, and the input/output interface 216 described with reference to FIG. 2 may correspond to an input module 1850, a sound output module 1855, a display module 1860, an audio module 1870, and a haptic module 1879. Also, the cleaning robot 1000 may correspond to an electronic device 1802 or an electronic device 1804.

Referring to FIG. 18, in the network environment 1800, the mobile device 1801 may communicate with the electronic device 1802 via a first network 1898 (e.g., a short-range wireless communication network) or may communicate with at least one of the electronic device 1804 or a server 1808 via a second network 1899 (e.g., a long-range wireless communication network). According to an embodiment, the mobile device 1801 may communicate with the electronic device 1804 via the server 1808. According to an embodiment, the mobile device 1801 may include the processor 1820, the memory 1830, the input module 1850, the sound output module 1855, the display module 1860, the audio module 1870, a sensor module 1876, an interface 1877, a connection terminal 1878, the haptic module 1879, a camera module 1880, a power management module 1888, a battery 1889, a communication module 1890, a subscriber identification module 1896, or an antenna module 1897. In a preset embodiment, at least one (e.g., the connection terminal 1878) of these elements may be omitted or one or more other elements may be added to the mobile device 1801. In a preset embodiment, some (e.g., the sensor module 1876, the camera module 1880, or the antenna module 1897) of these elements may be integrated into one element (e.g., the display module 1860).

The processor 1820, for example, may execute software (e.g., a program 1840) to control at least one other element (e.g., a hardware or software element) of the mobile device 1801 connected to the processor 1820 and may perform various data processing or operations. According to an embodiment, as at least part of data processing or operation, the processor 1820 may store command or data received from another component (e.g., the sensor module 1876 or the communication module 1890) in the volatile memory 1832, may process the command or data stored in the volatile memory 1832, and may store resultant data in the non-volatile memory 1834. According to an embodiment, the processor 1820 may include a main processor 1821 (e.g., a central processing unit or an application processor) or an auxiliary processor 1823 (e.g., a graphics processing unit, a neural processing unit (NPU), an image signal processor, a sensor hub processor, or a communication processor) operable independently from or together with the main processor 1821. For example, when the mobile device 1801 includes the main processor 1821 and the auxiliary processor 1823, the auxiliary processor 1823 may use less power than the main processor 1821, or may be set to be specialized for a specified function. The auxiliary processor 1823 may be implemented separately from or as part of the main processor 1821.

The auxiliary processor 1823 may, for example, on behalf of the main processor 1821 while the main processor 1821 is in an inactive state (e.g., sleep), or together with the main processor 1821 while the main processor 1821 is in an active state (e.g., executing an application), control at least some of functions or states related to at least one (e.g., the display module 1860, the sensor module 1876, or the communication module 1890) of the elements of the mobile device 1801. According to an embodiment, the auxiliary processor 1823 (e.g., an image signal processor or communication processor) may be implemented as part of another functionally related element (e.g., the camera module 1880 or the communication module 1890). According to an embodiment, the auxiliary processor 1823 (e.g., a neural network processing unit) may include a hardware structure specialized for processing an artificial intelligence model. The artificial intelligence model may be generated via machine learning. Such training may be performed, for example, in the mobile device 1801 itself on which the artificial intelligence model training is performed, or may be performed via a separate server (e.g., the server 1808). Examples of the learning algorithm may include supervised learning, unsupervised learning, semi-supervised learning, and reinforcement learning, but are not limited thereto. The AI model may include a plurality of artificial neural network layers. Examples of an artificial neural network may include deep neural network (DNN), convolutional neural network (CNN), recurrent neural network (RNN), restricted Boltzmann machine (RBM), deep belief network (DBN), bidirectional recurrent deep neural network (BRDNN), deep Q-network or a combination of two or more of the above, but the present disclosure is not limited thereto. The AI model may include, additionally or alternatively, a software structure besides the hardware structure.

The memory 1830 may store various data used by at least one element (e.g., the processor 1820 or the sensor module 1876) of the mobile device 1801. The data may include, for example, input data or output data for software (e.g., the program 1840) and command related thereto. The memory 1830 may include the volatile memory 1832 or the non-volatile memory 1834.

The program 1840 may be stored as software in the memory 1830, and may include, for example, an operating system 1842, middleware 1844, or an application 1846.

The input module 1850 may receive a command or data to be used in an element (e.g., the processor 1820) of the mobile device 1801 from an external source (e.g., a user) of the mobile device 1801. The input module 1850 may include, for example, a microphone, a mouse, a keyboard, a key (e.g., a button), or a digital pen (e.g., a stylus pen).

The sound output module 1855 may output a sound signal to the outside of the mobile device 1801. The sound output module 1855 may include, for example, a speaker or a receiver. The speaker may be used for general purposes such as multimedia reproduction or recording reproduction. The receiver may be used to receive an incoming call. According to an embodiment, the receiver may be implemented separately from or as part of the speaker.

The display module 1860 may visually provide information to an external source (e.g., a user) of the mobile device 1801. The display module 1860 may include, for example, a display, a hologram device, or a projector and a control circuit configured to control a corresponding device. According to an embodiment, the display module 1860 may include a touch sensor configured to sense a touch or a pressure sensor configured to measure the intensity of a force generated by the touch.

The audio module 1870 may convert sound into an electric signal or, conversely, convert an electric signal into sound. According to an embodiment, the audio module 1870 may obtain sound via the input module 1850 or may output sound via the sound output module 1855 or an external electronic device (e.g., the electronic device 1802) (e.g., a speaker or a headphone) directly or wirelessly connected to the mobile device 1801.

The sensor module 1876 may detect an operating state (e.g., power or temperature) of the mobile device 1801 or an external environmental state (e.g., a user state), and may generate an electrical signal or a data value corresponding to the detected state. According to an embodiment, the sensor module 1876 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols that may be used for the mobile device 1801 to be directly or wirelessly connected to an external electronic device (e.g., the electronic device 1802). According to an embodiment, the interface 1877 may include, for example, a high definition multimedia interface (HDMI), a universal serial bus (USB) interface, an SD card interface, or an audio interface.

The connection terminal 1878 may include a connector via which the mobile device 1801 may be physically connected to an external electronic device (e.g., the electronic device 1802). According to an embodiment, the connection terminal 1878 may include, for example, an HDMI connector, a USB connector, an SD card connector, or an audio connector (e.g., a headphone connector).

The haptic module 1879 may convert an electrical signal into a mechanical stimulus (e.g., vibration or movement) or an electrical stimulus which the user may perceive via tactile or kinesthetic sense. According to an embodiment, the haptic module 1879 may include, for example, a motor, a piezoelectric element, or an electrical stimulation device.

The camera module 1880 may capture still images and moving images. According to an embodiment, the camera module 1880 may include one or more lenses, image sensors, image signal processors, or flashes.

The power management module 1888 may manage power supplied to the mobile device 1801. According to an embodiment, the power management module 1888 may be implemented as, for example, at least a part of a power management integrated circuit (PMIC).

The battery 1889 may supply power to at least one element of the mobile device 1801. According to an embodiment, the battery 1889 may include, for example, a non-rechargeable primary cell, a rechargeable secondary cell, or a fuel cell.

The communication module 1890 may establish a direct (e.g., wired) communication channel or a wireless communication channel between the mobile device 1801 and an external electronic device (e.g., the electronic device 1802, the electronic device 1804, or the server 1808) and may support communication via the established communication channel. The communication module 1890 may include one or more communication processors that operate independently from the processor 1820 (e.g., an application processor) and support direct (e.g., wired) communication or wireless communication. According to an embodiment, the communication module 1890 may include a wireless communication module 1892 (e.g., a cellular communication module, a short-range wireless communication module, or a GNSS communication module) or a wired communication module 1694 (e.g., a local area network (LAN) communication module, or a power line communication module). A corresponding communication module among these communication modules may communicate with the external electronic device 1804 via the first network 1898 (e.g., a short-range communication network such as Bluetooth, wireless fidelity (WiFi) direct, or infrared data association (IrDA)) or the second network 1899 (e.g., a long-range communication network such as a legacy cellular network, a 5G network, a next-generation communication network, the Internet, or a computer network (e.g., LAN or WAN). These various types of communication modules may be integrated into one element (e.g., a single chip) or may be implemented as a plurality of elements (e.g., multiple chips) separate from each other. The wireless communication module 1892 may use subscriber information (e.g., International Mobile Subscriber Identifier (IMSI)) stored in the subscriber identification module 1896 so as to check or authenticate the mobile device 1801 within a communication network, such as the first network 1898 or the second network 1899.

The wireless communication module 1892 may support a 5G network after a 4th-generation (4G) network and a next-generation communication technology, for example, a new radio (NR) access technology. The NR access technology may support high-speed transmission of large-volume data (enhanced mobile broadband (eMBB)), minimization of terminal power consumption and access to multiple terminals (massive machine type communications (mMTC)), or high reliability and low latency (ultra-reliable and low-latency communications (URLLC)). The wireless communication module 1892 may support, for example, a high frequency band (e.g., mmWave band) to achieve a high data rate. The wireless communication module 1892 may support various technologies for securing performance in a high frequency band, for example, beamforming, massive multiple-input and multiple-output (MIMO), full dimensional MIMO (FD-MIMO), array antenna, analog beamforming, or large scale antenna. The wireless communication module 1892 may support various requirements specified in the mobile device 1801, an external electronic device (e.g., the electronic device 1804), or a network system (e.g., the second network 1899). According to an embodiment, the wireless communication module 1892 may support a peak data rate (e.g., equal to or more than 20 Gbps)

for realization of eMBB, loss coverage (e.g., equal to or less than 164 dB) for realization of mMTC, or U-plane latency for realization of URLLC (e.g.: downlink (DL) and uplink (UL) each equal to or less than 0.5 ms, or equal to or less than 1 ms of round trip).

The antenna module 1897 may transmit or receive a signal or power to an external source (e.g., an external electronic device). According to an embodiment, the antenna module 1897 may include an antenna including a conductor formed on a substrate (e.g., a printed circuit board (PCB)) or a radiator formed in a conductive pattern. According to an embodiment, the antenna module 1897 may include a plurality of antennas (e.g., array antennas). In this case, at least one antenna appropriate for a communication scheme used in a communication network such as the first network 1898 or the second network 1899 may be selected from the plurality of antennas by, for example, the communication module 1890. A signal or power may be transmitted or received between the communication module 1890 and an external electronic device via the selected at least one antenna. According to a preset embodiment, other elements (e.g., a radio frequency integrated circuit (RFIC)) as well as the radiator may be additionally formed as a part of the antenna module 1897.

According to various embodiments, the antenna module 1897 may form an mmWave antenna module. According to an embodiment, the mmWave antenna module may include a PCB, an RFIC disposed on or adjacent to a first surface (e.g., a lower surface) of the PCB and capable of supporting a designated high frequency band (e.g., an mmWave band) and a plurality of antennas (e.g., array antennas) disposed on or adjacent to a second surface (e.g., an upper surface or a side surface) of the PCB and capable of transmitting or receiving signals of the designated high frequency band.

At least some of the elements may be connected to each other via a communication scheme (e.g., a bus, general purpose input and output (GPIO), a serial peripheral interface (SPI), or a mobile industry processor interface (MIPI)) between neighboring devices and may exchange signals (e.g., command or data) with each other.

According to an embodiment, the command or data may be transmitted or received between the mobile device 1801 and the external electronic device 1804 via the server 1808 connected to the second network 1899. Each of the external electronic devices 1802 or 1804 may be the same type as or a different type of device from the mobile device 1801. According to an embodiment, all or part of the operations executed by the mobile device 1801 may be executed by one or more of the external electronic devices 1802, 1804, or 1608. For example, when the mobile device 1801 needs to perform a preset function or service automatically or in response to a request from a user or other device, the mobile device 1801 may request one or more external electronic devices to perform at least part of the function or the service, instead of executing the function or service by itself or additionally. The one or more external electronic devices that receive the request may execute at least a part of the requested function or service, or an additional function or service related to the request, and may deliver a result of the execution to the mobile device 1801. The mobile device 1801 may process the result as it is or additionally and may provide the processed result as at least a part of a response to the request. To this end, for example, cloud computing, distributed computing, mobile edge computing (MEC), or client-server computing technology may be used. The user terminal 1601 may provide an ultra-low latency service using, for example, distributed computing or mobile edge computing. In another embodiment, the external electronic device 1604 may include an IoT device. The server 1808 may be an intelligent server that uses machine learning and/or a neural network. According to an embodiment, the electronic device 1804 or the server 1808 in the outside may be included in the second network 1899. The mobile device 1801 may be applied to an intelligent service (e.g., smart homes, smart cities, smart cars, or health care), based on a 5G communication technology and an IoT-related technology.

The term "module" used in various embodiments of the present document may refer to a unit implemented as hardware, software, or firmware, and may be interchangeably used with the term such as logic, a logic block, a part, or a circuit. The "module" may be an integrated component, or a portion or a minimum unit of the integrated component which performs one or more functions. For example, according to an embodiment, the "module" may be implemented in the form of an ASIC.

Various embodiments of the present document may be implemented as software (e.g., a program) including one or more instructions stored in a storage medium that can be read by a machine (e.g., the mobile device 3000, the cleaning robot 1000). For example, a processor of a device (e.g., the mobile device 110, the first electronic device 120, or the second electronic device 140) may call at least one instruction from among one or more instructions stored in the storage medium, and may execute it. This causes the device to perform at least one function according to the called at least one instruction. The one or more instructions may include code generated by a compiler or code executable by an interpreter. The machine-readable storage medium may be provided in the form of a non-transitory storage medium. Here, the term 'non-transitory storage medium' means that the storage medium is a tangible entity and does not include a signal (e.g., an electromagnetic wave), and the term does not distinguish that data is stored semi-permanently or temporarily on the storage medium.

According to an embodiment, the method according to various embodiments disclosed in the present document may be provided in a computer program product.

The computer program product may be traded between a seller and a purchaser as a commodity. The computer program product may be distributed in the form of the machine-readable storage medium (e.g., CD-ROM), or may be distributed online (e.g., downloaded or uploaded) through an application store (e.g., PlayStore™) or directly between two user devices (e.g., smart phones). For online distribution, at least a part of the computer program product may be temporarily generated or be at least temporarily stored in a machine-readable storage medium such as a manufacturer's server, an application store's server, or a memory of a relay server.

According to various embodiments, each element (e.g., a module or a program) of elements described above may include a singular object or a plurality of objects, and some of the plurality of objects may be distributed in other element. According to various embodiments, one or more elements or operations may be omitted from among the above-described corresponding elements, or one or more other elements or operations may be added. Alternatively or additionally, a plurality of elements (e.g., modules or programs) may be integrated into one element. In this case, the integrated element may perform one or more functions of each element of the plurality of element identically or similarly to those performed by the corresponding element among the plurality of element prior to integration. According to various embodiments, operations performed by the module, the program, or another element may be executed sequentially, in parallel, repeatedly, or heuristically, one or more operations of the operations may be executed in a different order or omitted, or one or more other operations may be added.

The invention claimed is:

1. An operating method of a cleaning robot, the operating method comprising:
   - receiving, from a server device, a lock setting request to set the cleaning robot to a lock state;
   - setting the cleaning robot to the lock state by inactivating an operation button of the cleaning robot or inactivating a voice recognition function of the cleaning robot, based on the lock setting request;
   - providing information indicating that the cleaning robot is in the lock state; and
   - based on an input of a user to release the cleaning robot from the lock state being identified, restarting the cleaning robot in a lock release state by restarting power of the cleaning robot.

2. The operating method of claim 1, wherein the lock setting request is input via a mobile device of the user that is registered in the server device, and
   - the restarting of the cleaning robot in the lock release state is based on the input of the user which is input through a reset button on the cleaning robot.

3. The operating method of claim 1, wherein the providing of information indicating that the cleaning robot is in the lock state comprises:
   - receiving an input through the operation button from the user while the cleaning robot is set to the lock state; and
   - based on the input through the operation button being received, displaying that the cleaning robot is in the lock state, on a light-emitting diode (LED) display of a front part of the cleaning robot, or providing a voice output indicating that the cleaning robot is in the lock state.

4. The operating method of claim 1, further comprising:
   - receiving, from the server device, a lock release request; and
   - releasing the cleaning robot from the lock state by activating the operation button of the cleaning robot or by activating the voice recognition function of the cleaning robot, based on the lock release request,
   - wherein the lock release request is input via a mobile device of the user that is registered in the server device.

5. The operating method of claim 4, wherein the releasing of the cleaning robot from the lock state by activating the operation button of the cleaning robot or by activating the voice recognition function of the cleaning robot, based on the lock release request, comprises:
   - releasing the lock state of the cleaning robot, based on an identification value (user account ID) of the lock setting request matches with an identification value (user account ID) of the lock release request.

6. The operating method of claim 1, further comprising:
   - identifying a network state of the cleaning robot; and
   - releasing the lock state of the cleaning robot, based on a network speed of the cleaning robot or a network signal strength of the cleaning robot remaining at a threshold value or less for a threshold time or more, based on the network state of the cleaning robot.

7. The operating method of claim 1, further comprising:
   - receiving, from the server device, a signal comprising information indicating that information of the cleaning robot is deleted from an account of the server device; and
   - based on the signal being received, releasing the lock state of the cleaning robot.

8. A non-transitory computer-readable recording medium having recorded thereon a computer program to execute the operating method of claim 1, on a computer.

9. A cleaning robot comprising:
   - a communication interface configured to wirelessly transmit or receive data by accessing a preset network;
   - a memory to store one or more instructions; and
   - at least one processor, connected to the memory, configured to execute the one or more instructions which are stored in the memory for:
     - receiving, from a server device, a lock setting request to set the cleaning robot to a lock state;
     - setting the cleaning robot to the lock state by inactivating an operation button of the cleaning robot, based on the lock setting request;
     - providing information indicating that the cleaning robot is in the lock state; and
   - based on an input of a user to release the cleaning robot from the lock state being identified, restarting the cleaning robot in a lock release state by restarting power of the cleaning robot.

10. The cleaning robot of claim 9, wherein the lock setting request is input via a mobile device of the user that is registered in the server device, and
    - the restarting of the cleaning robot in the lock release state is based on the input of the user which is input through a reset button on the cleaning robot.

11. The cleaning robot of claim 9, wherein the providing of information indicating that the cleaning robot is in the lock state comprises:
    - receiving an input through the operation button from the user while the cleaning robot is set to the lock state; and
    - based on the input through the operation button being received, displaying that the cleaning robot is in the lock state, on a light-emitting diode (LED) display of a front part of the cleaning robot, or providing a voice output indicating that the cleaning robot is in the lock state.

12. The cleaning robot of claim 9, wherein the at least one processor is further configured to
    - receive, from the server device, a lock release request, and
    - release the cleaning robot from the lock state by activating the operation button of the cleaning robot, based on the lock release request, and
    - wherein the lock release request is input via a mobile device of the user that is registered in the server device.

13. The cleaning robot of claim 12, wherein the releasing of the cleaning robot from the lock state by activating the operation button of the cleaning robot, based on the lock release request, comprises:
    - releasing the lock state of the cleaning robot, based on an identification value (mobile ID) of the lock setting request matches with an identification value (mobile ID) of the lock release request.

14. The cleaning robot of claim 9, wherein the at least one processor is further configured to:
    - identify a network state of the cleaning robot, and
    - release the lock state of the cleaning robot, based on a network speed of the cleaning robot or a network signal strength of the cleaning robot remaining at a threshold value or less for a threshold time or more, based on the network state of the cleaning robot.

15. The cleaning robot of claim 9, wherein the at least one processor is further configured to receive, from the server device, a signal comprising information indicating that information of the cleaning robot is deleted from an account of the server device, and based on the signal being received, release the lock state of the cleaning robot.

* * * * *